US008978311B1

(12) United States Patent
Uhl

(10) Patent No.: US 8,978,311 B1
(45) Date of Patent: Mar. 17, 2015

(54) MOBILE STAGE SYSTEM

(71) Applicant: Century Industries, LLC, Sellersburg, IN (US)

(72) Inventor: Robert D. Uhl, Louisville, KY (US)

(73) Assignee: Century Industries, LLC, Sellersburg, IN (US)

(*) Notice: Subject to any disclaimer, the term of this patent is extended or adjusted under 35 U.S.C. 154(b) by 0 days.

(21) Appl. No.: 14/047,161

(22) Filed: Oct. 7, 2013

Related U.S. Application Data

(60) Provisional application No. 61/710,375, filed on Oct. 5, 2012.

(51) Int. Cl.
*E04H 3/26* (2006.01)

(52) U.S. Cl.
USPC ..................................... 52/7; 52/79.5; 52/36.1

(58) Field of Classification Search
USPC ............ 52/6–7, 29.5, 173.1, 36.1–36.2, 79.5, 52/36.4–36.5
See application file for complete search history.

(56) References Cited

U.S. PATENT DOCUMENTS

| 3,258,884 | A | * | 7/1966 | Wenger | 52/6 |
| 4,720,945 | A | * | 1/1988 | Berranger et al. | 52/7 |
| 5,103,600 | A | * | 4/1992 | Geiger et al. | 52/6 |
| 5,152,109 | A | * | 10/1992 | Boers | 52/143 |
| 5,375,899 | A | * | 12/1994 | Wright | 296/21 |
| 5,398,463 | A | * | 3/1995 | Wright | 52/7 |
| 6,176,495 | B1 | | 1/2001 | Decker | |
| 8,296,999 | B2 | * | 10/2012 | Uhl | 52/9 |
| 8,544,213 | B2 | * | 10/2013 | Allison | 52/7 |
| 2004/0123529 | A1 | * | 7/2004 | Wiese et al. | 52/6 |

\* cited by examiner

*Primary Examiner* — Jeanette E. Chapman
(74) *Attorney, Agent, or Firm* — Stites & Harbison, PLLC; David W. Nagle, Jr.

(57) ABSTRACT

In a mobile stage system, a pair of hydraulic actuators at each end of the stage, in combination with certain structural elements, provides all of the necessary movement to transition the mobile stage system from the transport position to a deployed position, i.e., raise the roof and deploy the canopies. The hydraulic actuators not only control raising of the roof and deployment of the canopies, but also deployment of the outer deck panels of the stage. The roof panels and the canopy panels of the mobile stage system may also be in the form of a single, one-piece fabric covering. The mobile stage system may also be provided with a hitch assembly that can be folded out of view of the audience.

19 Claims, 36 Drawing Sheets

MOBILE STAGE SYSTEM

CROSS-REFERENCE TO RELATED APPLICATIONS

The present application claims priority to U.S. Provisional Patent Application Ser. No. 61/710,375 filed on Oct. 5, 2012, the entire disclosure of which is incorporated herein by reference.

BACKGROUND OF THE INVENTION

Stages provide a platform for concerts, theatrical performances and other similar events. Permanent stages are installed in locations where such events are frequent. However, for events that occur on a less frequent basis, temporary stage systems may be used. Such temporary stage systems are often mounted on some form of mobile framework for ready transport to the location of the event. Once at the appropriate location, the stage system can be transitioned from the transport position to a deployed position using hydraulic actuators (or similar mechanical or electromechanical actuators). Thus, such mobile stage systems provide the desired functionality on a short-term basis and without the time and labor required to set up conventional stages.

In prior art mobile stage systems, however, the use of hydraulic actuators is quite complicated. Furthermore, in prior art mobile stage systems, after the stage system has been transitioned to the deployed position, it is often necessary to erect vertical columns to support the roof and canopies of the stage system. Thus, there remains a need for simplified mechanics and movements to raise the roof and deploy the canopies.

In prior art mobile stage systems, it is also common for the roof to be in the form of panels of a fabric covering. However, if such fabric coverings are used, they commonly are loosely attached to accommodate the transition of the mobile stage system from the transport position to the deployed position, or vice versa. Such loose attachment can lead to sagging and water leakage. Furthermore, when such fabric coverings are used, they routinely have to be removed when the mobile stage system is in a transport position (because of the wind and water loads during travel), and then reinstalled when the mobile stage system is transitioned to the deployed position. Of course, such removal and reinstallation is time-consuming.

As an alternative, in some prior art mobile stage systems, fabric coverings are replaced with rigid panels made of fiberglass or similar materials. However, such rigid panels require a flexible weather joint between each panel to accommodate the relative movement of the roof and canopy sections in the transition of the mobile stage system from the transport position to the deployed position, or vice versa. Furthermore, the hard surfaces of such panels can be less desirable, for example, due to sound reflection, brittleness, weight, and the maintenance requirements for the flexible weather joints. Thus, there also remains a need for alternative constructions for the roof panels of a mobile stage system.

SUMMARY OF THE INVENTION

The present invention is an improved mobile stage system that addresses the deficiencies of prior art mobile stage systems by providing a construction in which a pair of hydraulic actuators at each end of the stage, in combination with certain structural elements, provides all of the necessary movement to raise the roof and deploy the canopies. The mobile stage system of the present invention also includes various other features and aspects that are important to the function and operation of the stage system and/or represent advancements or improvements over prior art mobile stage systems.

For example, in some exemplary embodiments, the hydraulic actuators of the mobile stage system not only control raising of the roof and deployment of the canopies, but also deployment of the outer deck panels of the stage.

For another example, in some exemplary embodiments, the mobile stage system is provided with a hitch assembly that can be folded out of view of the audience and is not an impediment to entry and exit from the side of the stage near the hitch nor an impediment to communications between performers on the stage and technicians on the side of the stage.

For another example, in some exemplary embodiments, the roof panels and the canopy panels of the mobile stage system are in the form of a single, one-piece fabric covering.

For another example, in some exemplary embodiments, the fabric covering is provided with perimeter catenary tensioning to better handle wind loads when the mobile stage system is in transport position or a deployed position, while also preventing fabric sagging and water ponding.

DESCRIPTION OF THE DRAWINGS

FIG. 24A is a partial enlarged view of the fabric covering of FIG. 24 that illustrates how lengths of webbing are passed through the buckles;

DETAILED DESCRIPTION OF THE INVENTION

Figure 1:
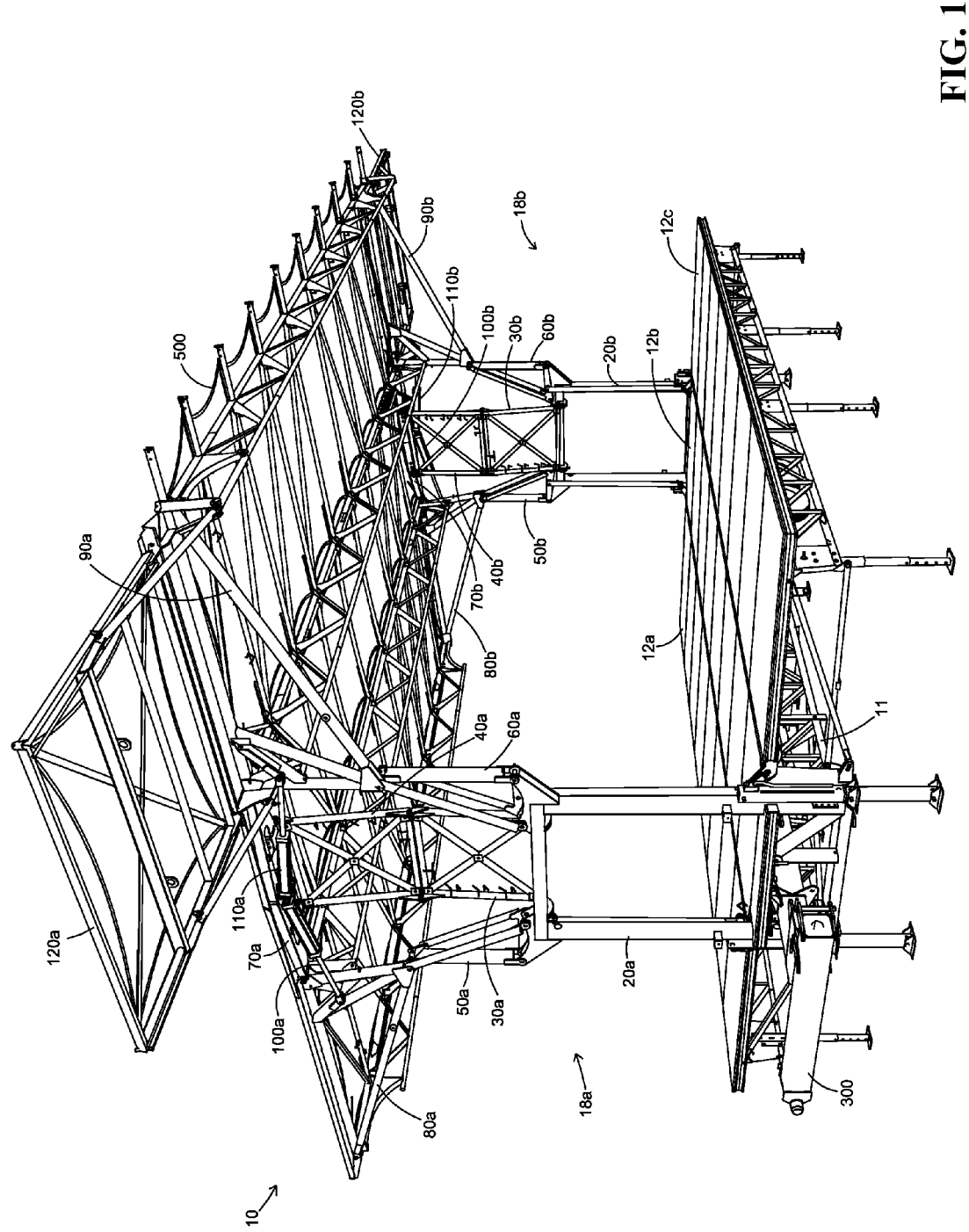
FIG. 1 is a perspective view of an exemplary mobile stage system made in accordance with the present invention in a deployed position.
Figure 1A:
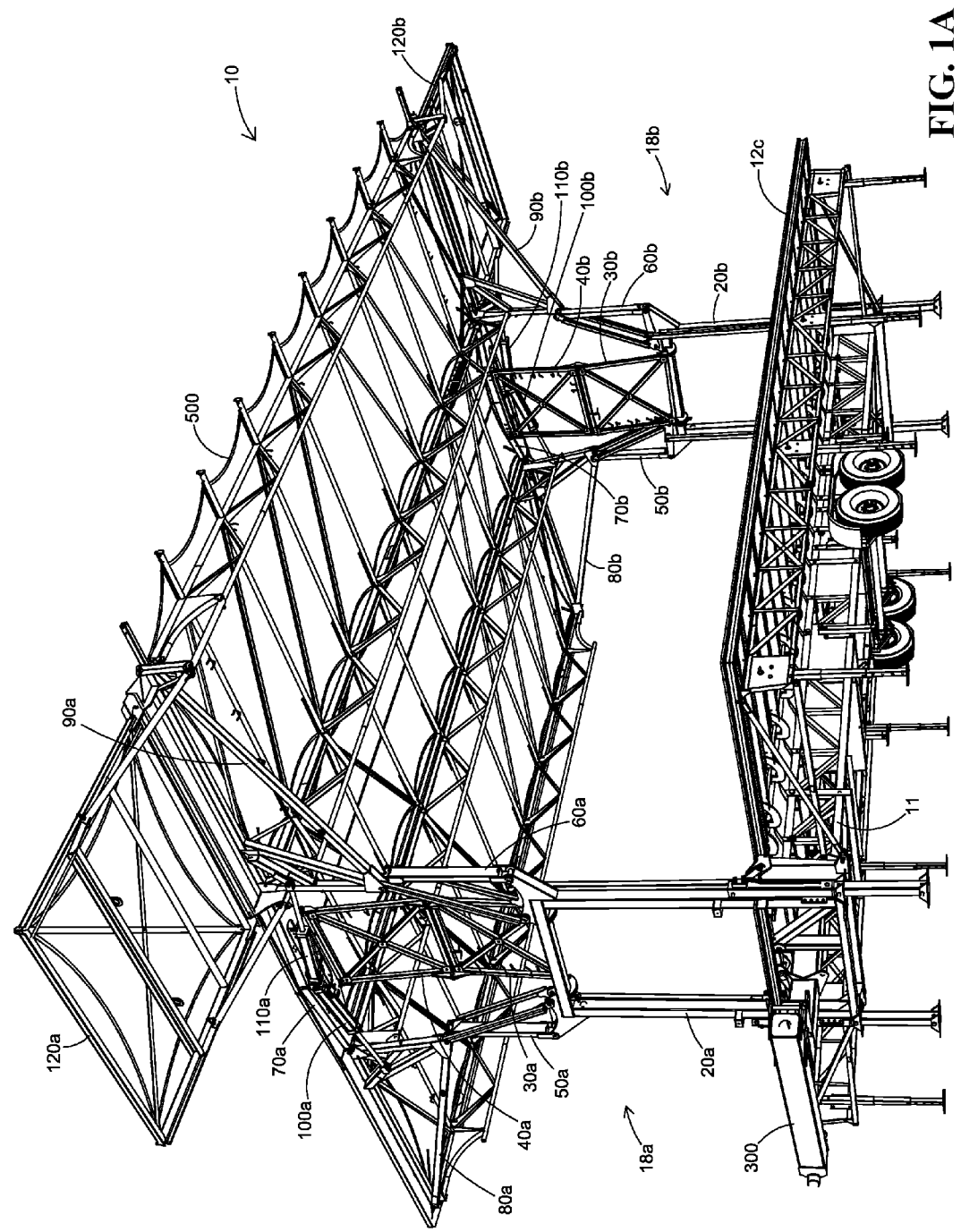
FIG. 1A is an alternate perspective view of the exemplary mobile stage system of FIG. 1.
Figure 1B:
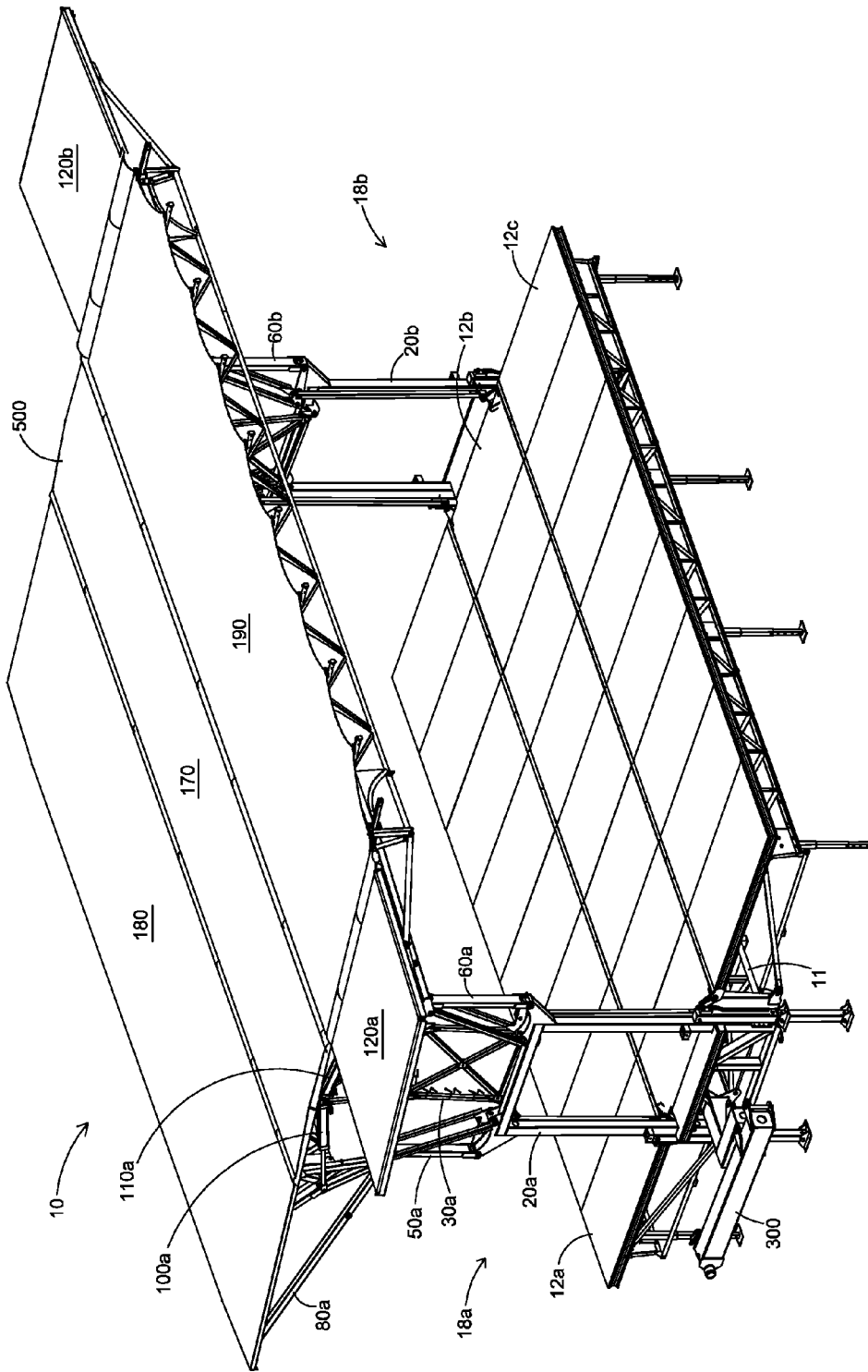
FIG. 1B is another alternate perspective view of the exemplary mobile stage system of FIG. 1.

FIGS. 1, 1A, 1B, 2-6 and 6A are various views of an exemplary mobile stage system 10 made in accordance with the present invention. The exemplary mobile stage system 10 includes an underlying support structure, which is generally indicated by reference numeral 11. Wheels and an associated suspension system are mounted to the underlying support structure 11 to facilitate transport of the mobile stage system 10, and it is preferred that the mobile stage system 10 is equipped with the necessary hitch, suspension, and other equipment as necessary to satisfy relevant Department of Transportation requirements so that the mobile stage system 10, when in the transport position, can be towed behind a truck.

The exemplary mobile stage system 10 further includes deck panels which are mounted to the underlying support structure 11. In this exemplary embodiment, there are three deck panels 12a, 12b, 12c. The middle deck panel 12b is fixed to the support structure 11. One outer deck panel 12a is pivotally secured to one edge of the middle deck panel 12b, while another outer deck panel 12c is pivotally secured to the opposite edge of the middle deck panel 12b. Accordingly, when the mobile stage system 10 is in a deployed position (FIG. 1), the outer deck panels 12a, 12c are rotated downwardly into a substantially horizontal position and cooperate with the middle deck panel 12b to form a stage deck. When the mobile stage system 10 is in a transport position, the outer deck panels 12a, 12c are rotated back into a substantially vertical position (FIG. 2).

The exemplary mobile stage system 10 further includes a superstructure 18a, 18b at each end of the stage that is mounted to the support structure 11. Each superstructure 18a, 18b generally comprises: a fixed frame 20a, 20b; a lower end pleat 30a, 30b; an upper end pleat 40a, 40b; a rear (or left) link 50a, 50b; a front (or right) link 60a, 60b; a roof support 70a, 70b; a rear (or left) canopy arm 80a, 80b; and a front (or right) canopy arm 90a, 90b.

Figure 2:
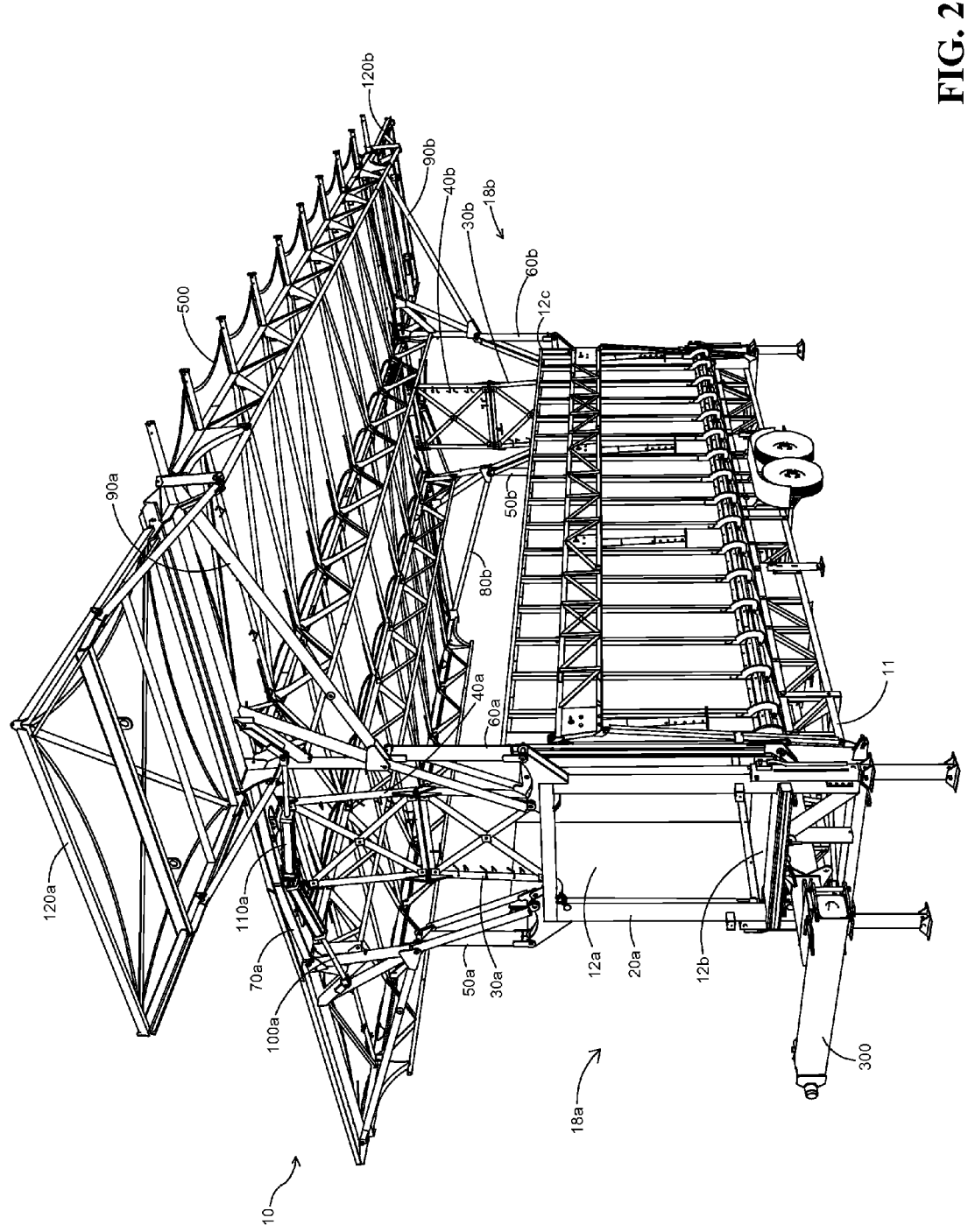
FIG. 2 is a perspective view of the exemplary mobile stage system similar to FIG. 1, but with the outer deck panels rotated into a vertical orientation.
Figure 3:
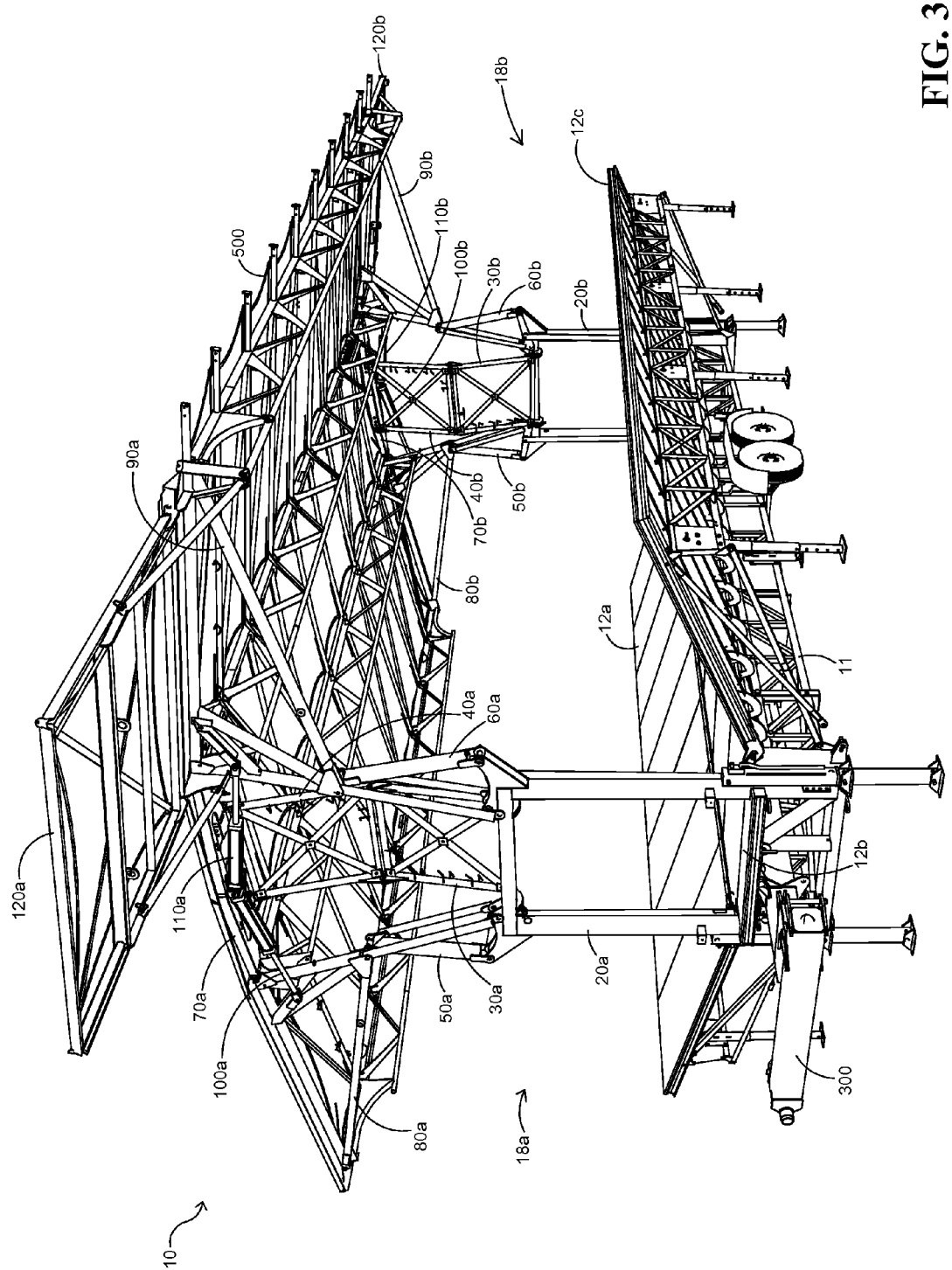
FIG. 3 is a perspective view of the exemplary mobile stage system of FIG. 1, showing the superstructures transitioning from the deployed position to a transport position.
Figure 4:
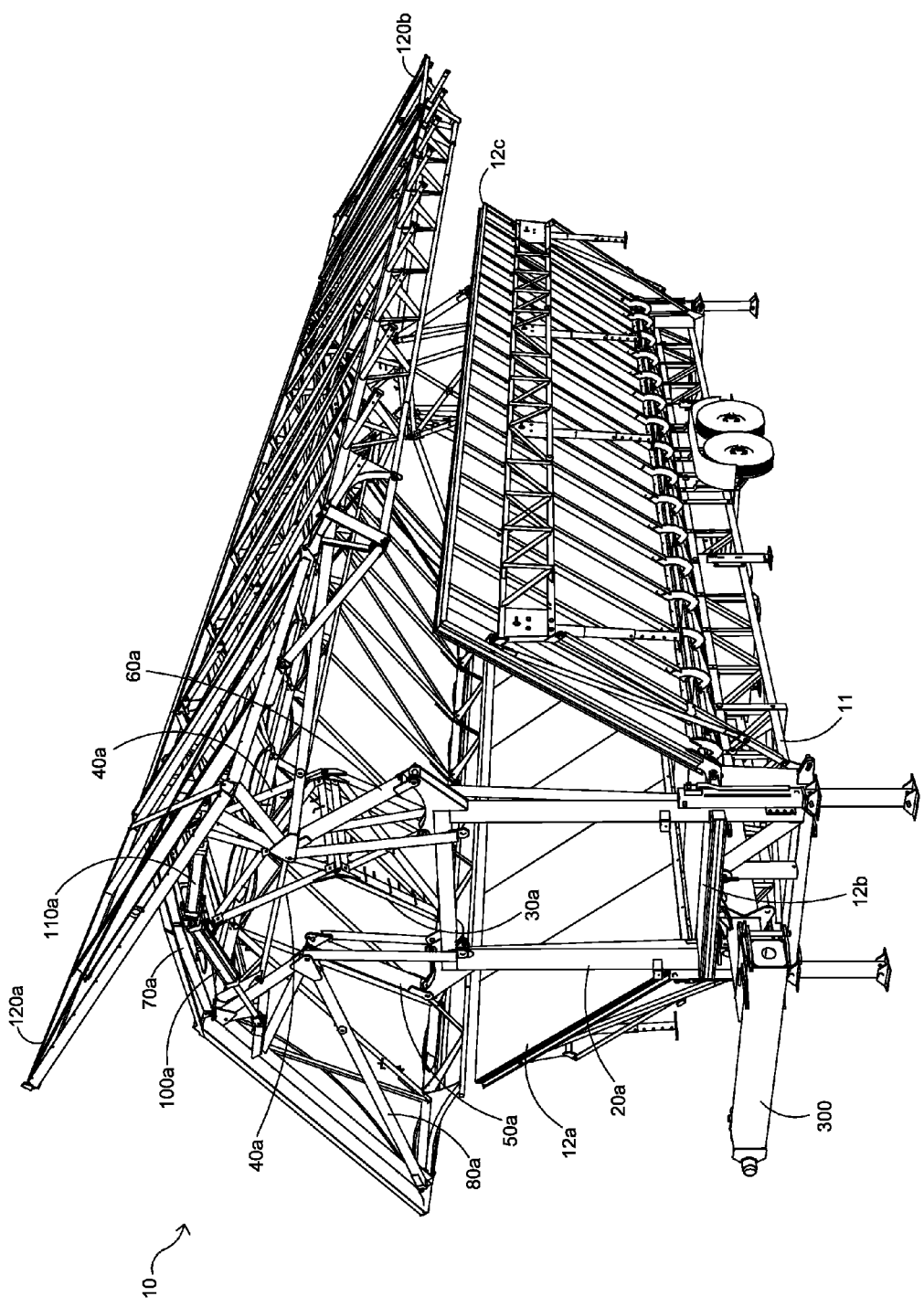
FIG. 4 is another perspective view of the exemplary mobile stage system of FIG. 1, with the fabric covering removed for purposes of illustration, and further showing the superstructures transitioning from the deployed position to the transport position.

As perhaps best shown in FIG. 1, roof panels and associated trusses that extend the length of the exemplary mobile stage system 10 are secured to and supported by the roof supports 70a, 70b, while respective front and rear canopy panels and associated trusses are secured to and supported by the rear (or left) canopy arms 80a, 80b and the front (or right) canopy arms 90a, 90b. As a result of such construction, the roof of the mobile stage system 10 can be characterized as having: a main roof 170, a rear canopy 180, and a front (or audience side) canopy 190; see FIG. 1B. In this exemplary embodiment, the roof of the mobile stage system 10 also includes left and right canopy wings 120a, 120b. Furthermore, and as described in further detail below, in some exemplary embodiments, the roof panels and the canopy panels are in the form of a fabric covering 500.

Each superstructure 18a, 18b also includes a rear actuator 100a, 100b and a front actuator 110a, 110b. In this regard, each such actuator 100a, 100b, 110a, 110b is preferably a hydraulic actuator or similar mechanical or electromechanical actuator.

FIGS. 7-14 are various views of one superstructure 18a. In the transport position, each of the actuators 100a, 110a is retracted; see, for example FIG. 10. The rear actuator 100a extends between and is connected to the roof support 70a at one (piston) end and to the rear canopy arm 80a at the other (rod) end. The front actuator 110a extends between and is connected to the roof support 70a at one (piston) end and to the front canopy arm 90a at the other (rod) end. Thus, when the rear actuator 100a is retracted, the rear canopy arm 80a is rotated downwardly around a pivot axis defined by a pin connection 200a between the roof support 70a and the rear canopy arm 80a. Similarly, when the front actuator 110a is retracted, the front canopy arm 90a is rotated downwardly around a pivot axis defined by a pin connection 202a between the roof support 70a and the front canopy arm 90a. Thus, when the mobile stage system 10 is in a transport position (FIGS. 6 and 6A), the main roof 170 serves as the top wall of the "trailer," while the front and rear canopies 180, 190 serve as the side walls of the "trailer."

As the actuators 100a, 110a are extended to transition the superstructure 18a to the deployed position or retracted to return the superstructure 18a to the transport position, there are multiple movements associated with such transition of the superstructure 18a. FIGS. 7-10 are side views that illustrate the transition of the superstructure 18a from the deployed position to the transport position, and FIGS. 11-14 are perspective views that illustrate the same transition of the superstructure 18a. As shown, as the rear actuator 100a is retracted, the rear canopy arm 80a begins rotating downwardly (or counterclockwise in FIGS. 7-10) around the pivot axis defined by the pin connection 200a. At the same time, as a result of a pin connection 210a between the rear canopy arm 80a and the rear link 50a, the rear link 50a begins to rotate inward (or clockwise in FIGS. 7-10) around a pivot axis defined by a pin connection 204a between the rear link 50a and the fixed frame 20a. Similarly, as the front actuator 110a is retracted, the front canopy arm 90a begins rotating downwardly (or clockwise in FIGS. 7-10) around the pivot axis defined by the pin connection 202a. At the same time, as a result of a pin connection 212a between the front canopy arm 90a and the front link 60a, the front link 60a begins to rotate inward (or counterclockwise in FIGS. 7-10) around a pivot axis defined by a pin connection 206a between the front link 60a and the fixed frame 20a.

As such rotation of the rear canopy arm 80a and the rear link 50a, along with the simultaneous rotation of the front canopy arm 90a and the front link 60a, there is also a corresponding movement of the lower end pleat 30a and the upper end pleat 40a. Specifically, the lower end pleat 30a is pivotally connected to the fixed frame 20a along its lower edge. The upper end pleat 40a is pivotally connected to the roof support 70a. The lower end pleat 30a and the upper end pleat 40a are then connected to one another, for example, using one or more hinges. Thus, as the rear canopy arm 80a and the front canopy arm 90a each rotate as a result of the retraction of the actuators 100a, 110a, the roof support 70a moves downward relative to the fixed frame 20a, and the lower end pleat 30a and the upper end pleat 40a collectively move from an extended position to a collapsed position (as perhaps best shown in FIG. 14).

Of course, when the mobile stage system 10 is in the transport position, extension of the actuators 100a, 110a moves the superstructure 18a to the deployed position. In this regard, as the rear actuator 100a is extended, the rear canopy arm 80a begins rotating upwardly (or clockwise in FIGS. 7-10) around the pivot axis defined by the pin connection 200a. At the same time, the rear link 50a begins to rotate outward (or counterclockwise in FIGS. 7-10) around the pivot axis defined by the pin connection 204a between the rear link 50a and the fixed frame 20a. Similarly, as the front actuator 110a is extended, the front canopy arm 90a begins rotating upwardly (or counterclockwise in FIGS. 7-10) around the pivot axis defined by the pin connection 202a. At the same time, the front link 60a begins to rotate outward (or clockwise in FIGS. 7-10) around the pivot axis defined by the pin connection 206a between the front link 60a and the fixed frame 20a. As the rear canopy arm 80a and the front canopy arm 90a rotate as a result of the extension of the actuators 100a, 110a, the roof support 70a moves upward relative to the fixed frame 20a, and the lower end pleat 30a and the upper end pleat 40a collectively move from the collapsed position (as perhaps best shown in FIG. 14) to the extended position.

With respect to FIGS. 7-10 and 11-14, in this exemplary embodiment, the superstructure 18a also includes a pair of locking bars 22a, 24a. While not critical to the above-described transitioning of the superstructure 18a between the transport position and the deployed position, such locking bars 22a, 24a are visible in FIGS. 7-10 and 11-14.

Thus, the actuators 100a, 110a, in cooperation with the superstructure 18a, along with the corresponding actuators and superstructure 18b at the other end of the stage, provide all of the necessary movement to raise the roof and deploy the canopies of the mobile stage system 10.

Figure 5:
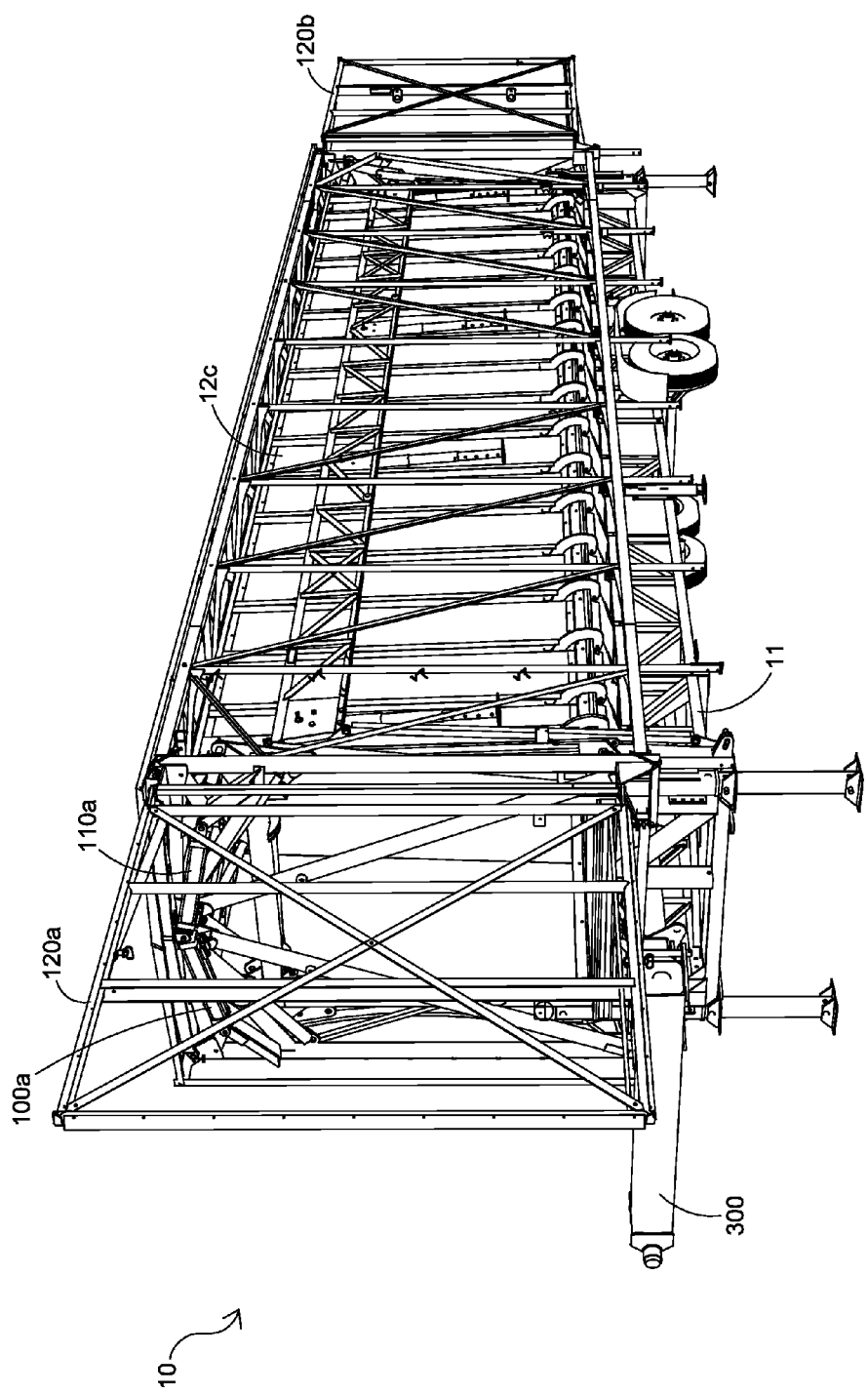
FIG. 5 is another perspective view of the exemplary mobile stage system of FIG. 1 in the transport position, with the exception of the canopy wings, and with the fabric covering removed for purposes of illustration.
Figure 6:
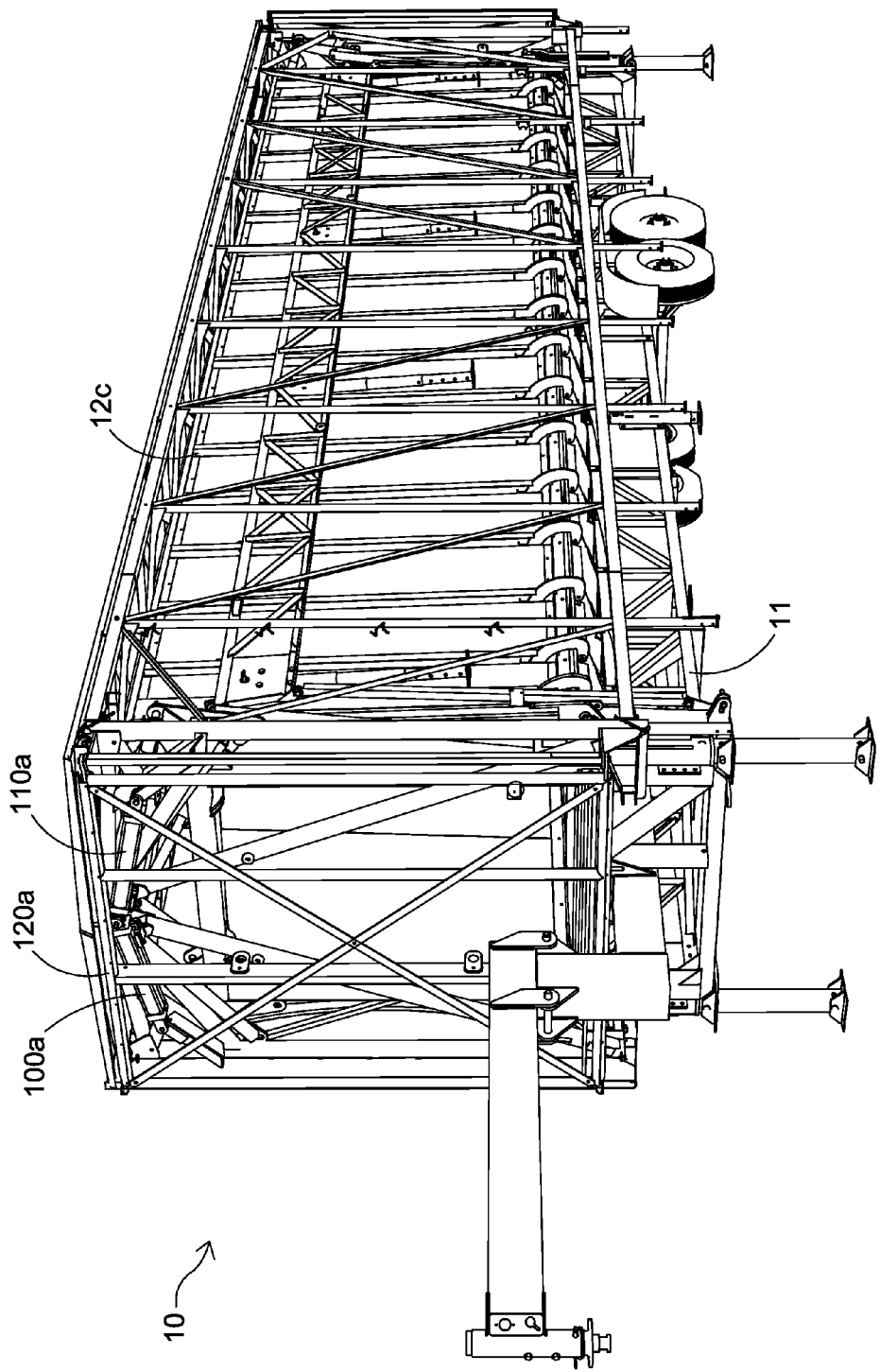
FIG. 6 is a perspective view of the exemplary mobile stage system of FIG. 1 in the transport position, with the fabric covering removed for purposes of illustration.
Figure 6A:
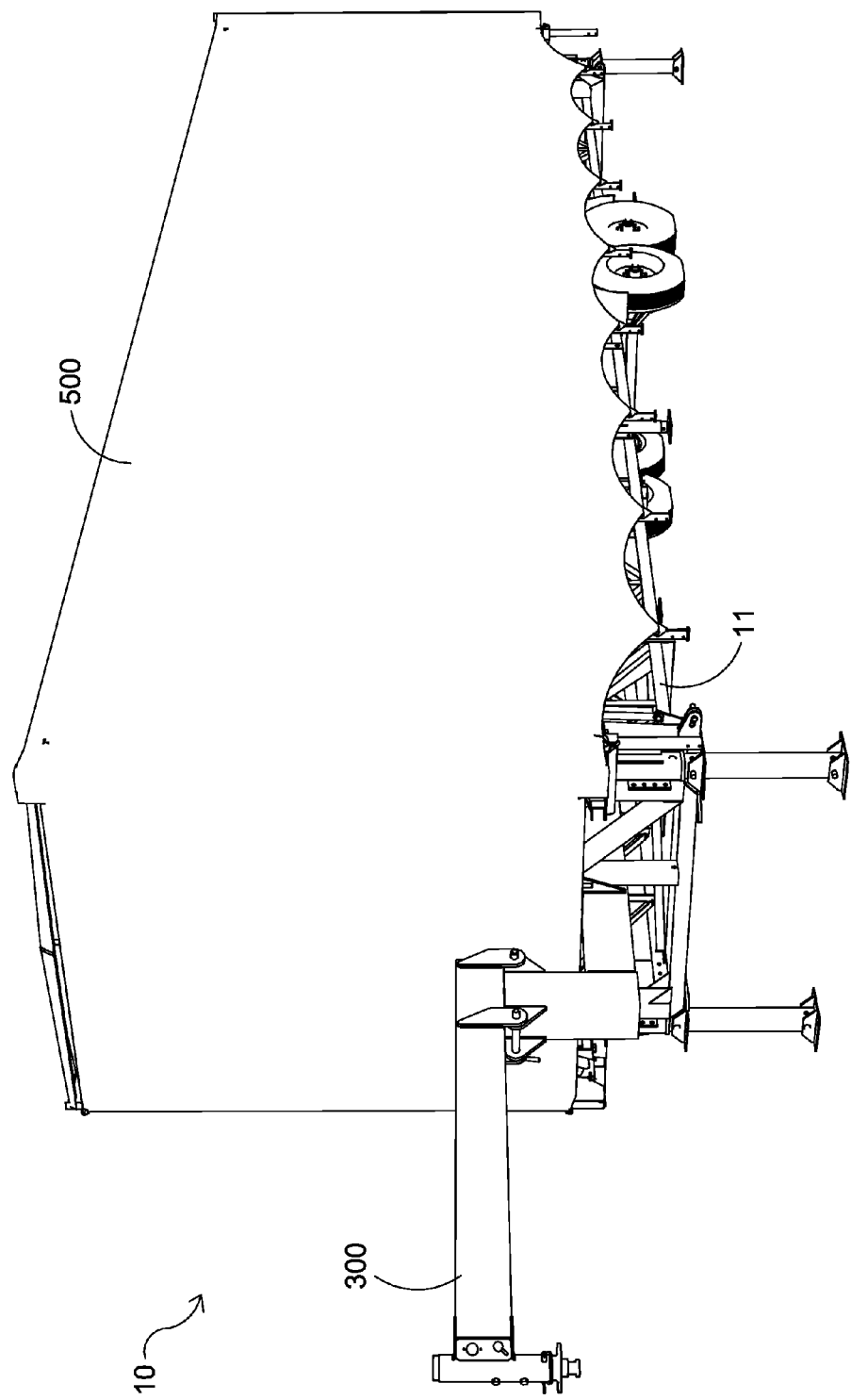
FIG. 6A is a perspective view substantially identical to FIG. 6, but including the fabric covering.
Figure 7:
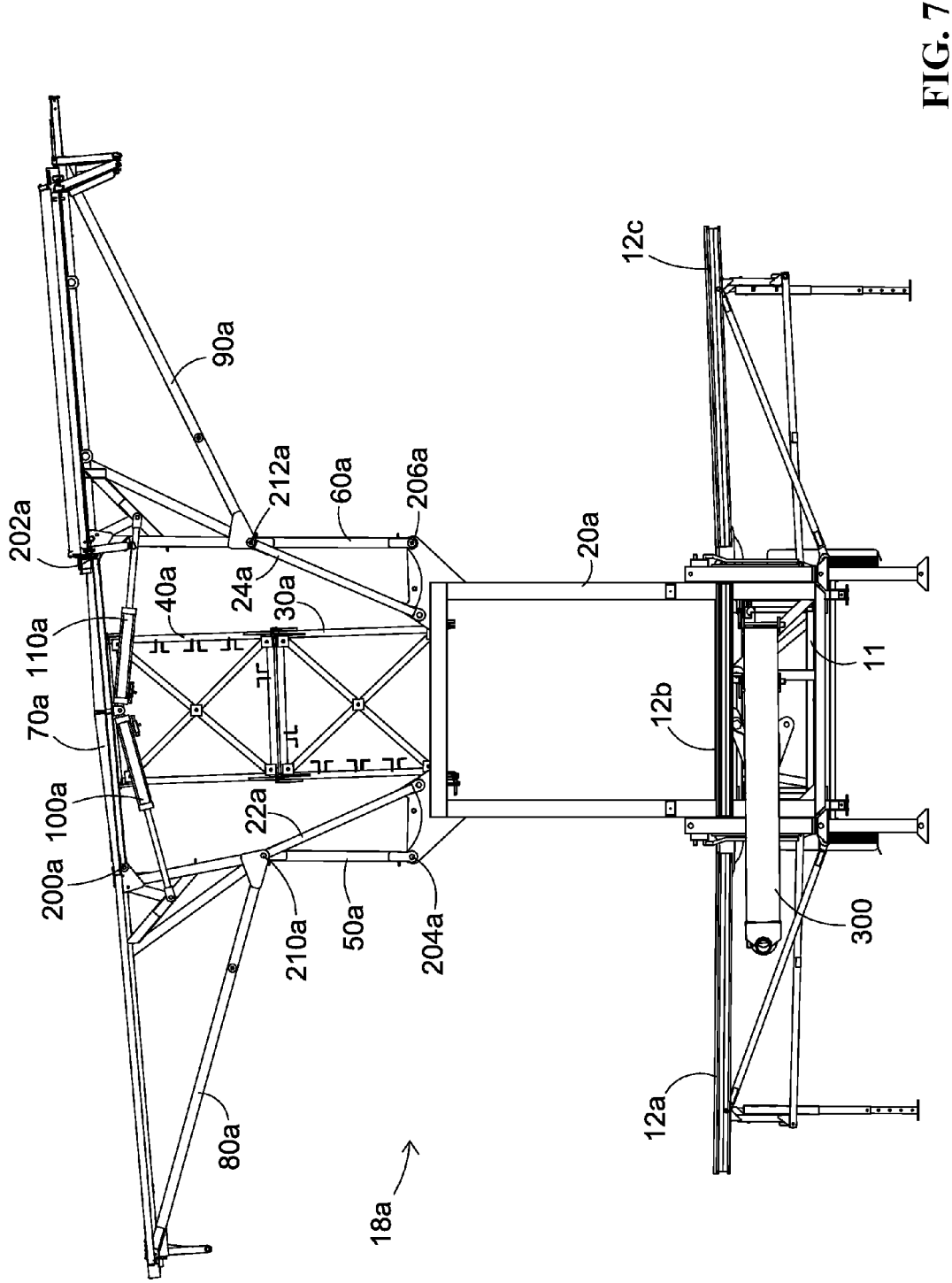
FIG. 7 is a side view of one of the superstructures of the exemplary mobile stage system of FIG. 1 in the deployed position.
Figure 8:
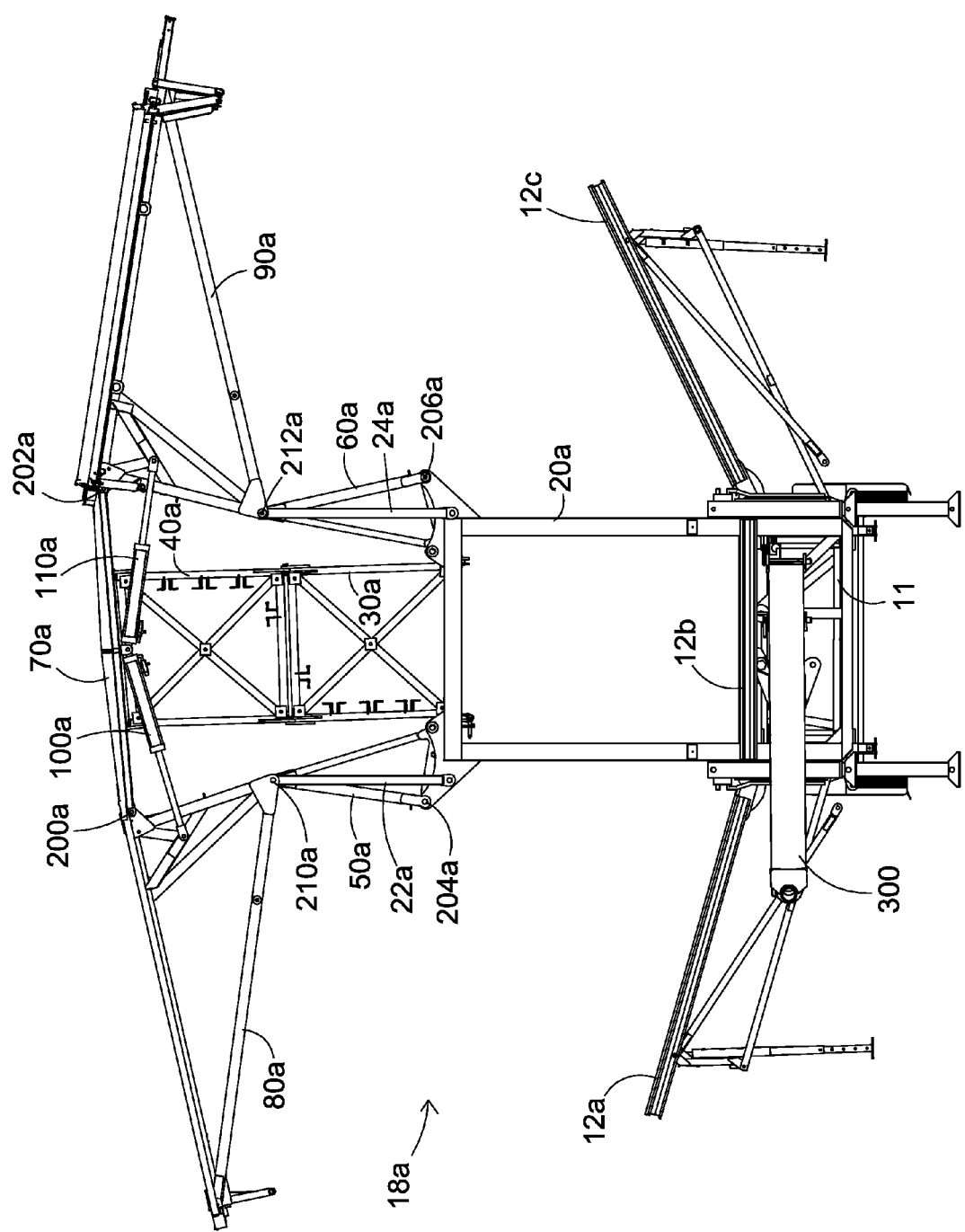
FIG. 8 is a side view of the superstructure of FIG. 7 as it transitions from the deployed position to the transport position.
Figure 9:
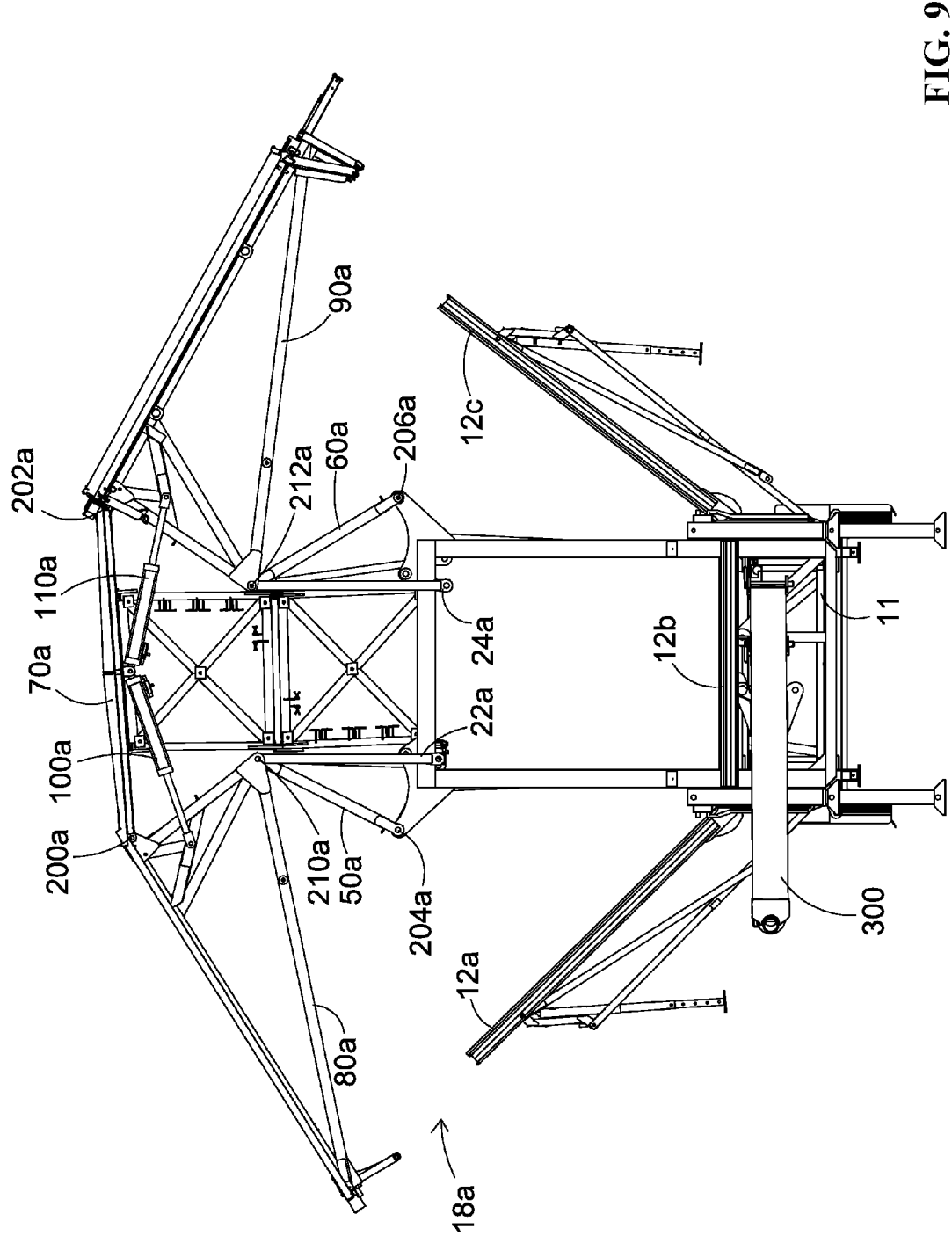
FIG. 9 is a side view of the superstructure of FIG. 7 as it continues to transition from the deployed position to the transport position.
Figure 10:
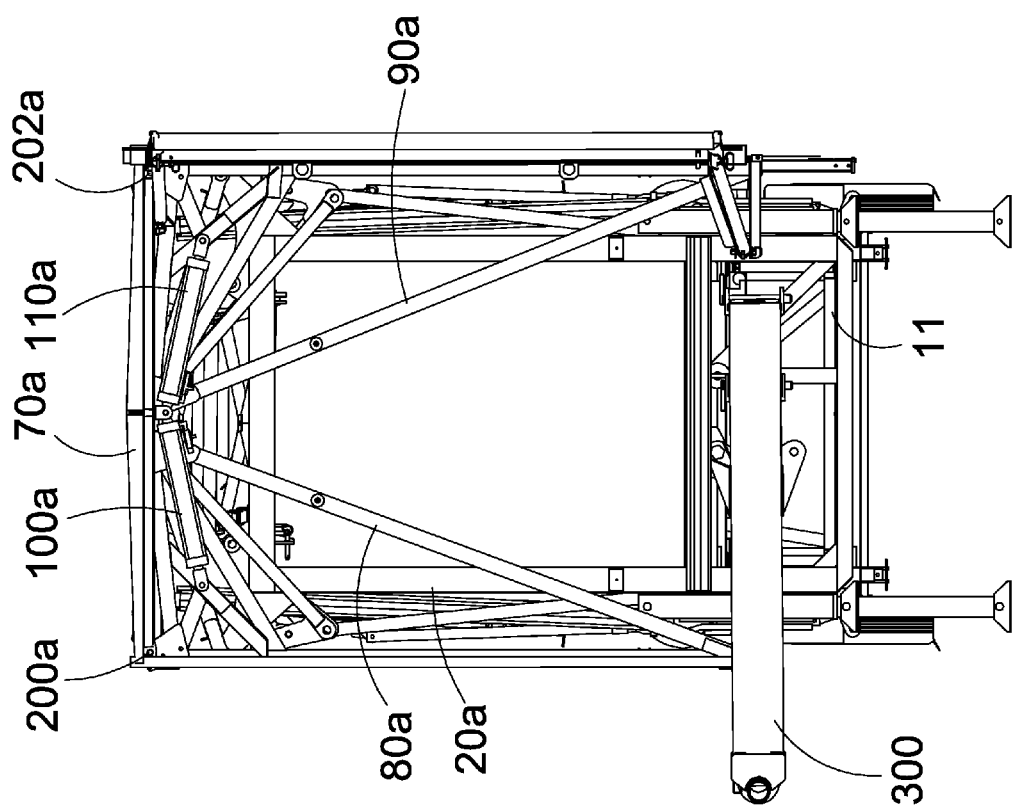
FIG. 10 is a side view of the superstructure of FIG. 7 in the transport position.

As mentioned above, in the exemplary embodiment described above with respect to FIGS. 1-14, the exemplary mobile stage system 10 also includes left and right canopy wings 120a, 120b that extend from either end of the mobile stage system 10. The left and right canopy wings 120a, 120b move and deploy with the front canopy 190. Specifically, as shown in FIG. 1, in the deployed position, one such canopy wing 120a is connected to and extends from the front canopy arm 90a, while the other such canopy wing 120b is connected to and extends from the front canopy arm 90b. Referring now to FIG. 5, when the actuators 100a, 100b, 110a, 110b have been retracted to return to the mobile stage system 10 to a transport position, the canopy wings 120a, 120b remain extended. However, each canopy wing 120a, 120b is pivotally connected to the respective front canopy arm 90a, 90b, so that canopy wings 120a, 120b can be rotated and folded against the remaining components of the exemplary mobile stage system 10, as shown in FIGS. 6 and 6A. In this position, and as mentioned above, the canopy wings 120a, 120b serve as the end walls of the "trailer" formed by the mobile stage system 10 when in the transport position.

As a further refinement, and referring again to FIGS. 11-13, in this exemplary embodiment, the hydraulic actuators not only control raising of the roof and deployment of the canopies, but also deployment of the outer deck panels 12a, 12c of the stage. Specifically, one or more linkage assemblies are used to operably connect the components for raising the roof and deploying the canopies to the outer deck panels 12a, 12c.

As shown in FIGS. 11, 11A, and 12-13, in one linkage assembly, at its uppermost end, a first link 400a shares the same pin connection 210a that pivotally connects the rear link 50a to the rear canopy arm 80a. A lower portion of the first link 400a is then pivotally connected to the fixed frame 20a and rotates about a pivot axis defined by a pin connection 402a. A second, substantially vertical link 404a is pivotally connected to and extends downward from the first link 400a. Thus, as the roof is lowered (as described above), the first link 400a rotates about the pivot axis defined by the pin connection 402a, which forces the second link 404a downward.

Figure 11:
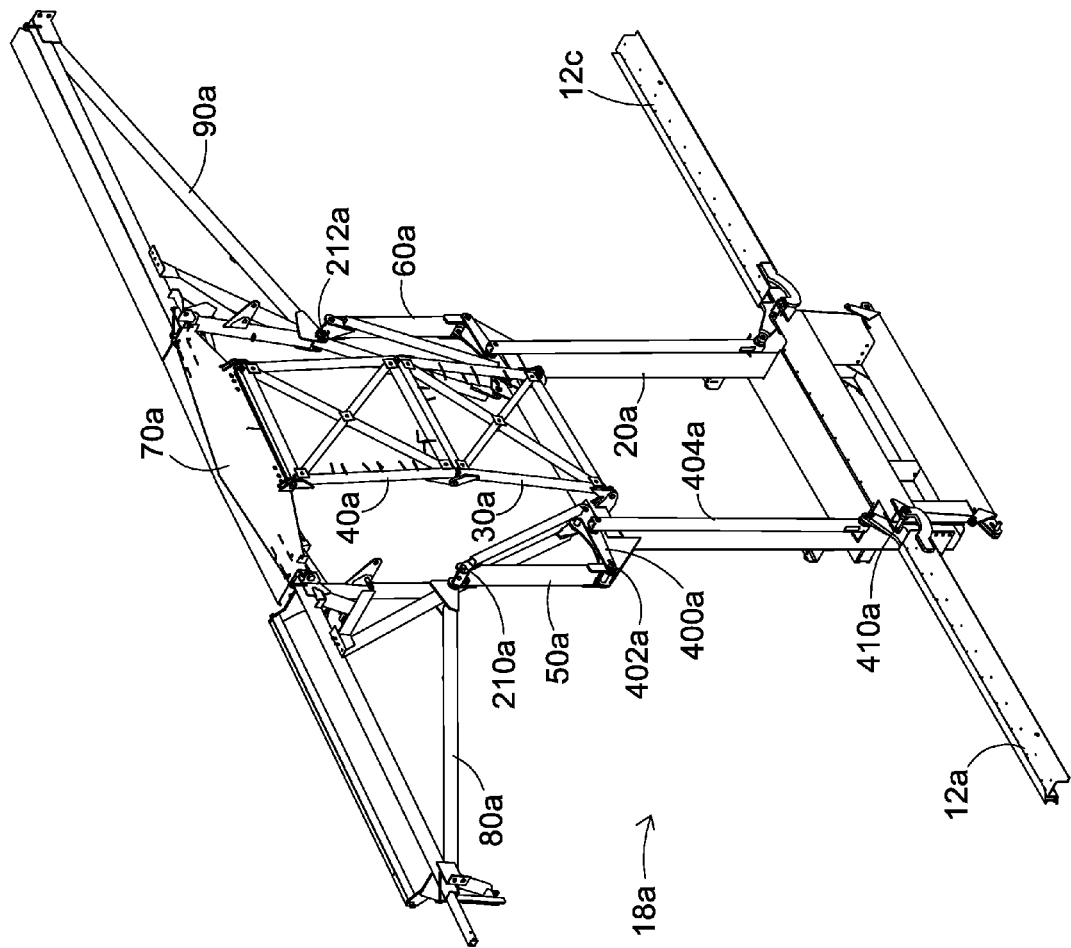
FIG. 11 is a perspective view of one of the superstructures of the exemplary mobile stage system of FIG. 1 in the deployed position.
Figure 11A:
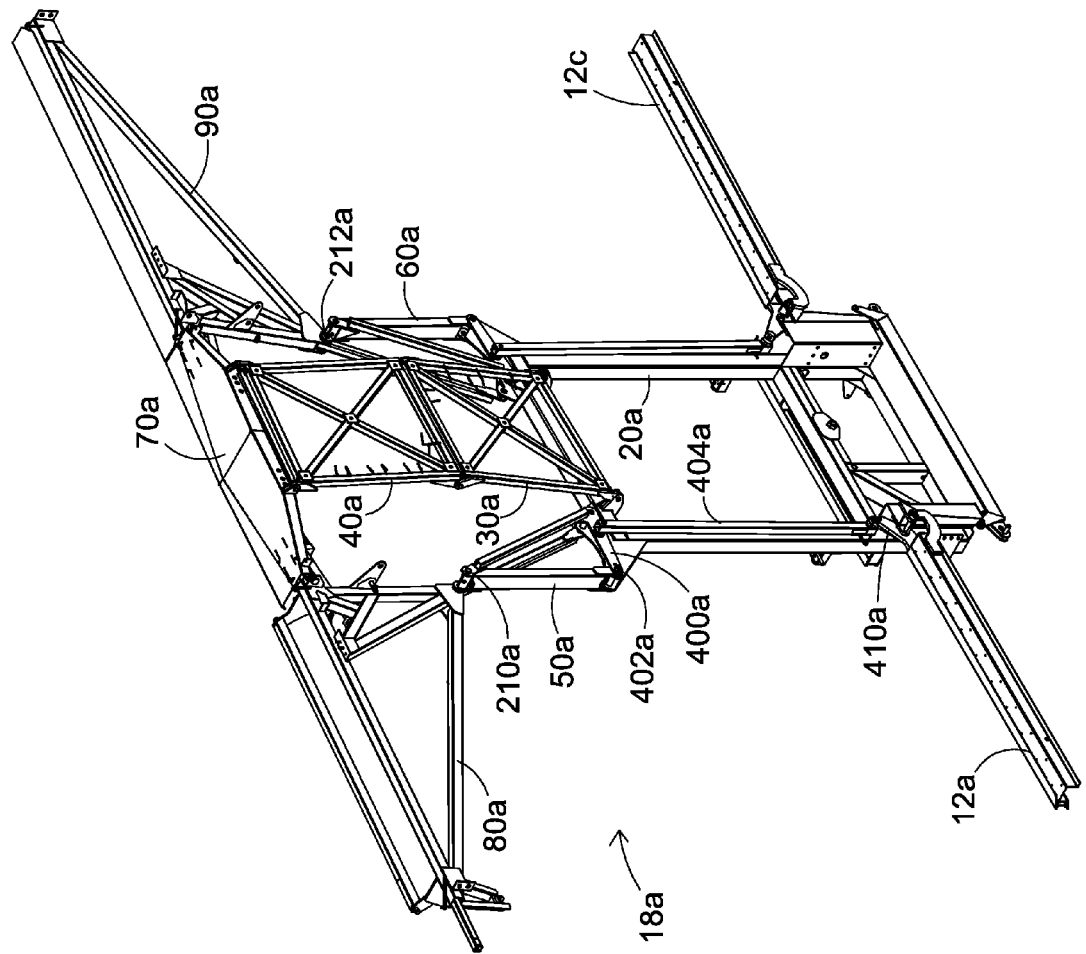
FIG. 11A is a perspective view substantially identical to FIG. 11, but with certain components hidden from view.
Figure 12:
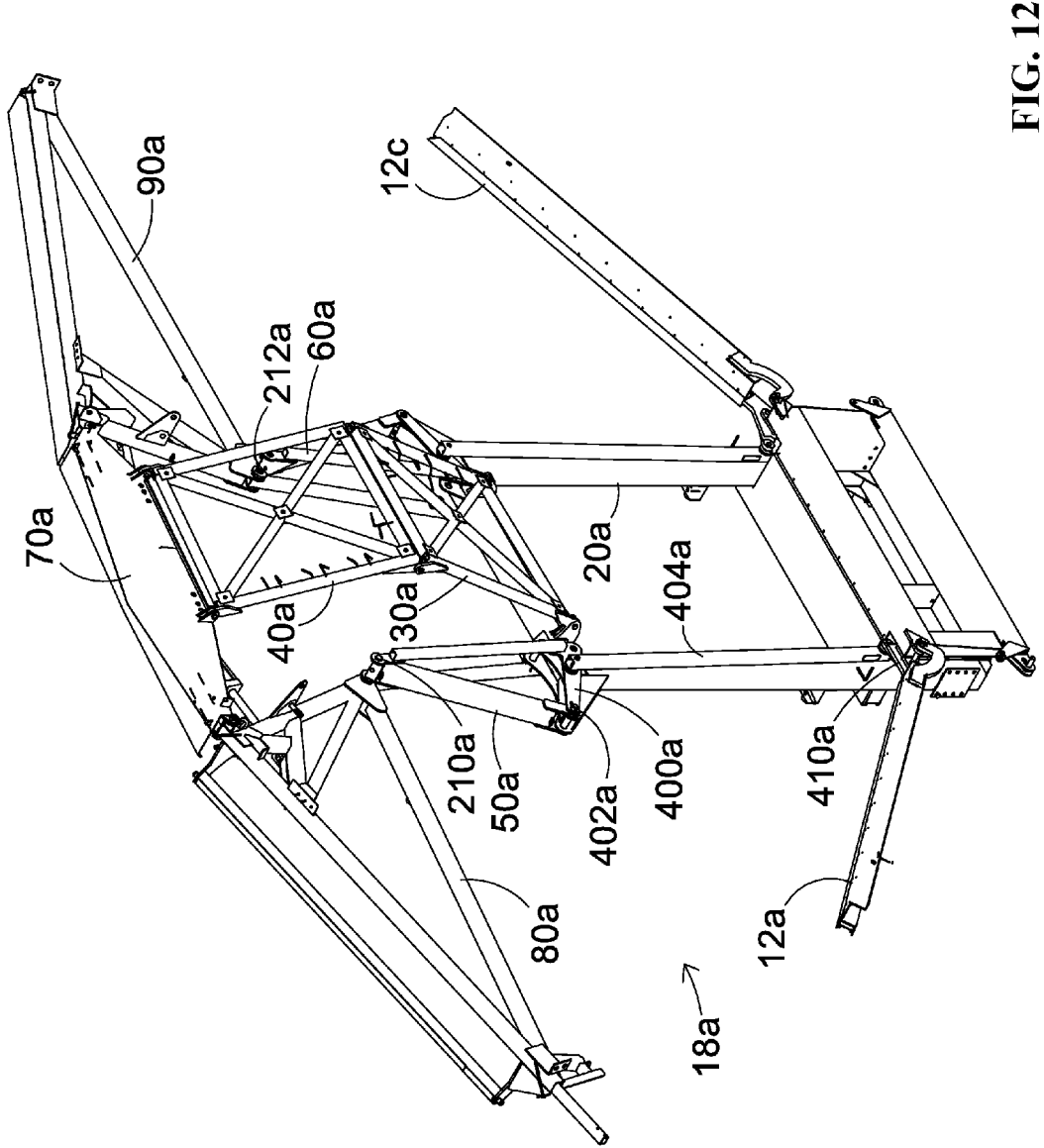
FIG. 12 is a perspective view of the superstructure of FIG. 11 as it transitions from the deployed position to the transport position.
Figure 13:
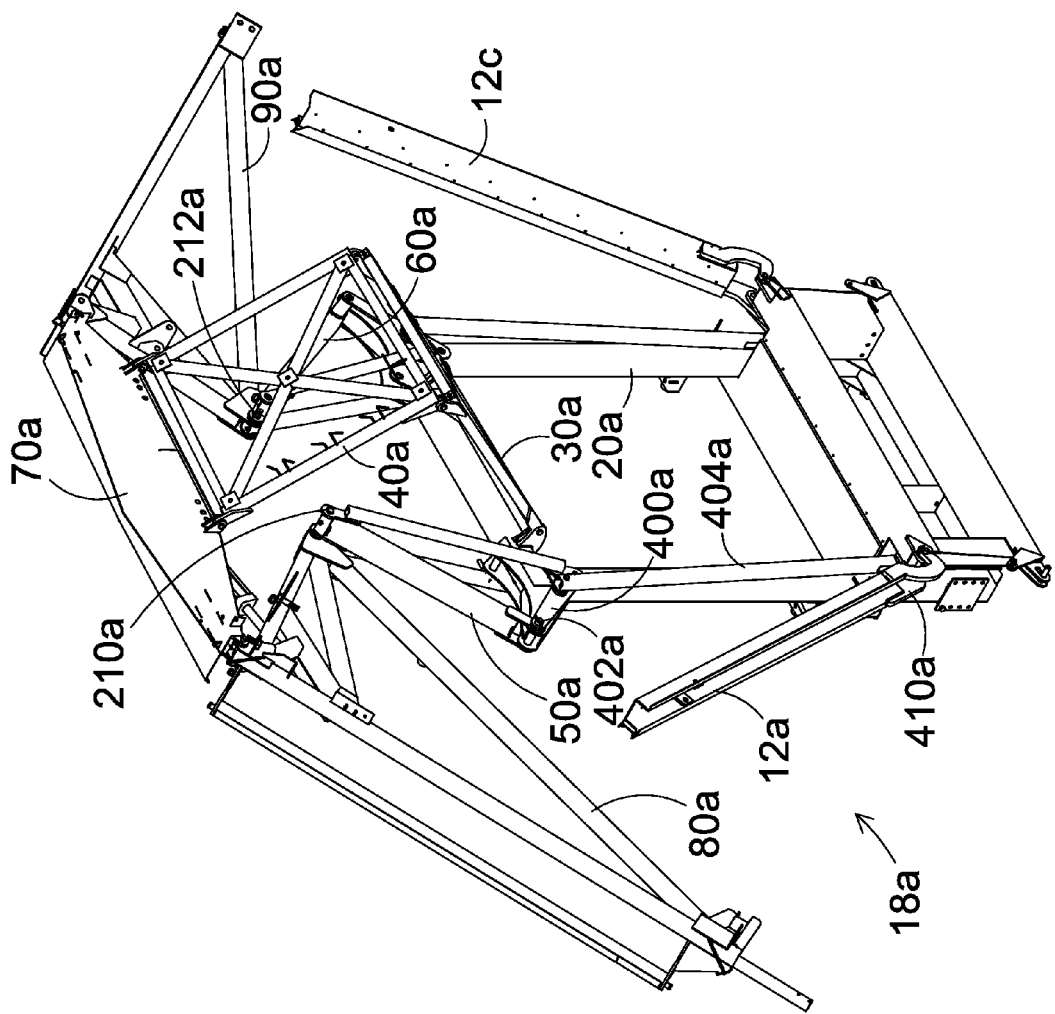
FIG. 13 is another perspective view of the superstructure of FIG. 11 as it transitions from the deployed position to the transport position.
Figure 14:
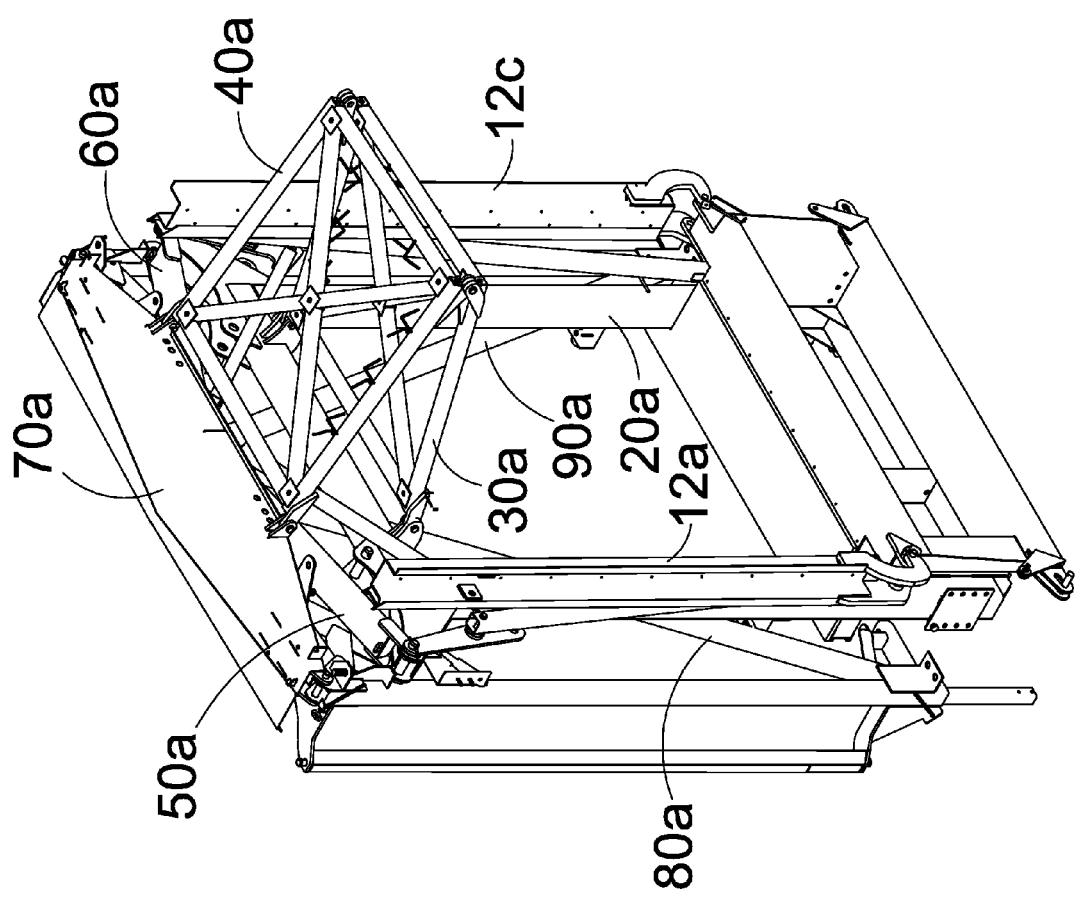
FIG. 14 is a perspective view of the superstructure of FIG. 11 in the transport position.

As best shown in FIG. 11A, a bell crank 410a is mounted for rotation relative to the fixed frame 20a near the connection between the middle deck panel 12b and the outer deck panel 12c. The distal end of the second link 404a is pivotally connected to one end of the bell crank 410a, and the opposite end of the bell crank 410a is fixed to the outer deck panel 12a.

Thus, the downward movement of the second link 404*a* causes the bell crank 410*a* to rotate. Such rotation then causes the outer deck panel 12*a* to be rotated into the substantially vertical (transport) position.

Referring again to FIGS. 1, 1A, and 1B, in this exemplary embodiment, there are actually four such linkage assemblies, one in each corner of the mobile stage system 10. Each such linkage assembly is substantially identical to the one described above, and as mentioned above, as a result of these linkage assemblies, actuation of the 100*a*, 110*a*, 100*b*, 110*b* not only effectuates raising of the roof and deployment the canopies, but also deployment of the outer deck panels 12*a*, 12*c*. As an additional advantage, since the outer deck panels 12*a*, 12*c* are rotating downward as the roof is being raised, the power required for deployment of the mobile stage system 10 is reduced. Furthermore, it is contemplated that the linkage assemblies can be readily disconnected so that, after the stage is set up, the roof can be separately lowered to add or change lights and/or to hang speakers, banners, or windwalls without moving the outer deck panels 12*a*, 12*c*; see, for example, FIG. 2.

Referring now to FIGS. 15-20 and 15A-20A, it is further contemplated that the mobile stage system of the present invention can be equipped with a gooseneck hitch assembly 300 which is secured to and extends from the support structure 11 (or the fixed frame 20*a* of one of the superstructures 18*a*), but can be folded out of the way when the stage system is in the deployed position. In this regard, in prior art constructions, the hitch (commonly a gooseneck or fifth wheel hitch) is sometimes configured such that it can be folded into a vertical orientation when the stage system is in a deployed position. However, when folded into such a vertical orientation, the hitch remains in the view of the audience and can also be an impediment to entry and exit from the side of the stage near the hitch and/or an impediment to communications between performers or the stage and technicians on the side of the stage.

Figure 15:
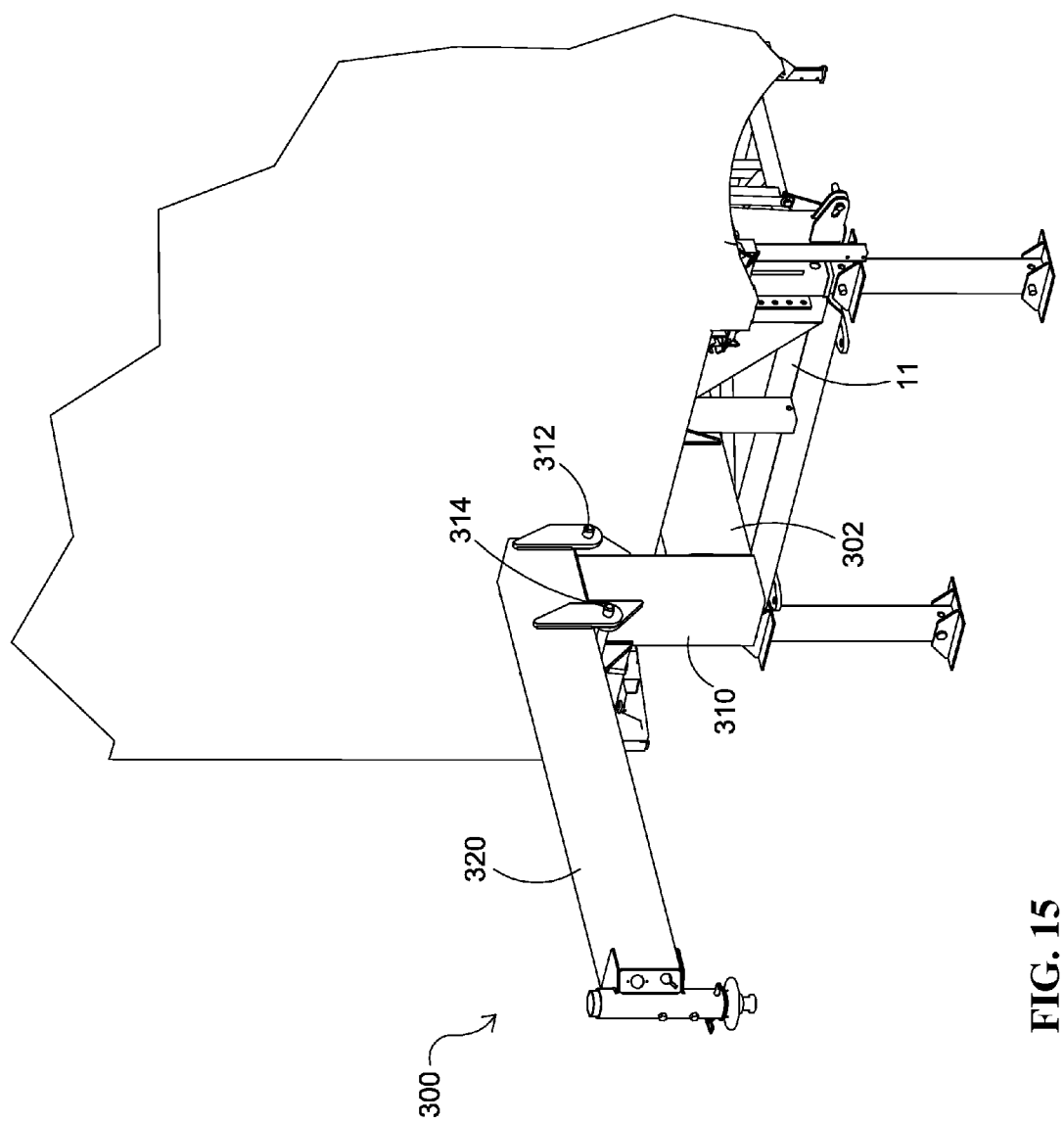
FIG. 15 is a perspective view of an exemplary hitch assembly incorporated into the mobile stage system of the present invention in a first (transport) position.
Figure 15A:
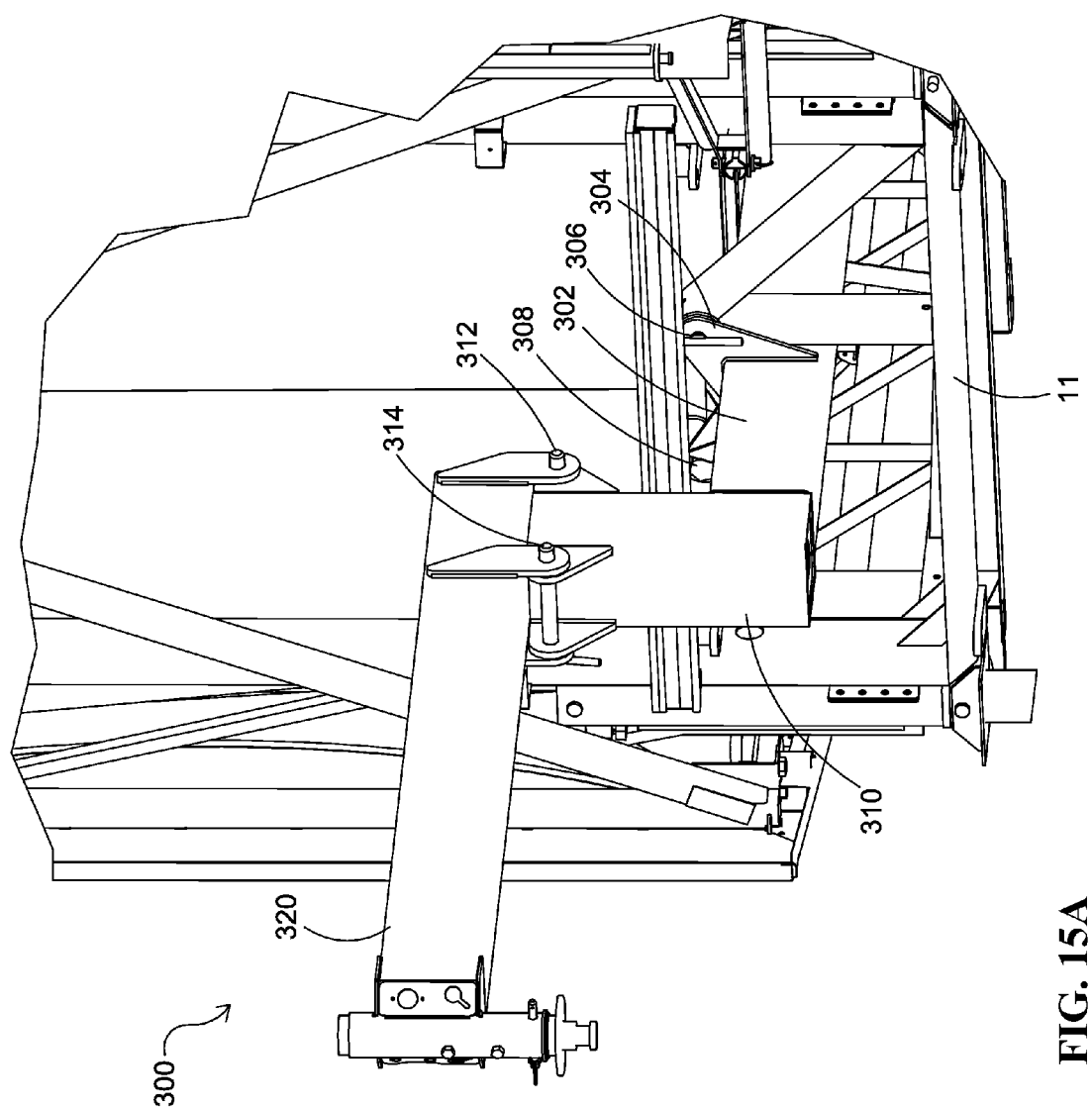
FIG. 15A is an alternate perspective view of the exemplary hitch assembly similar to FIG. 15, but with the fabric covering of the canopy wing hidden from view.
Figure 16:
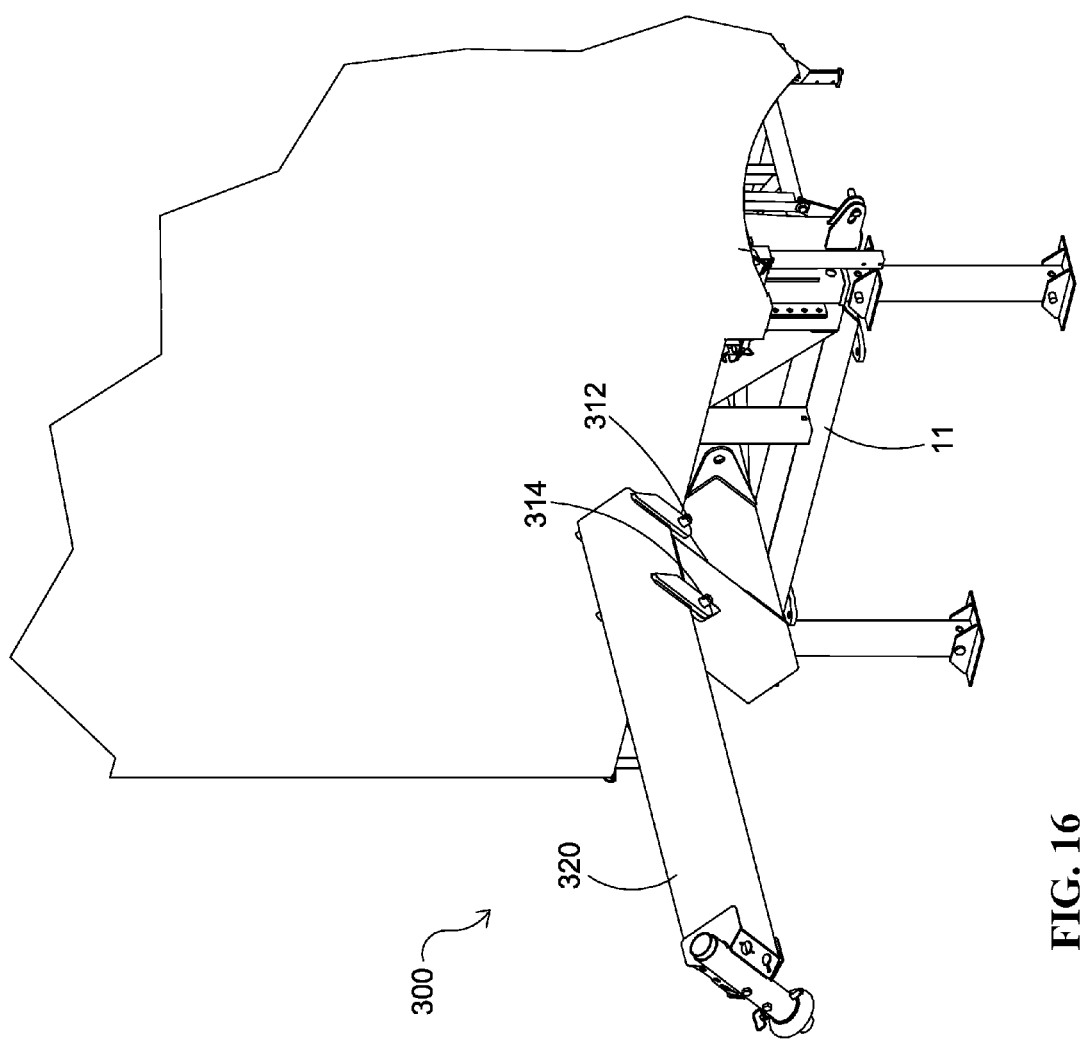
FIG. 16 is a perspective view of the exemplary hitch assembly of FIG. 15 as it is transitioned from the first (transport) position to a second (storage) position.
Figure 16A:
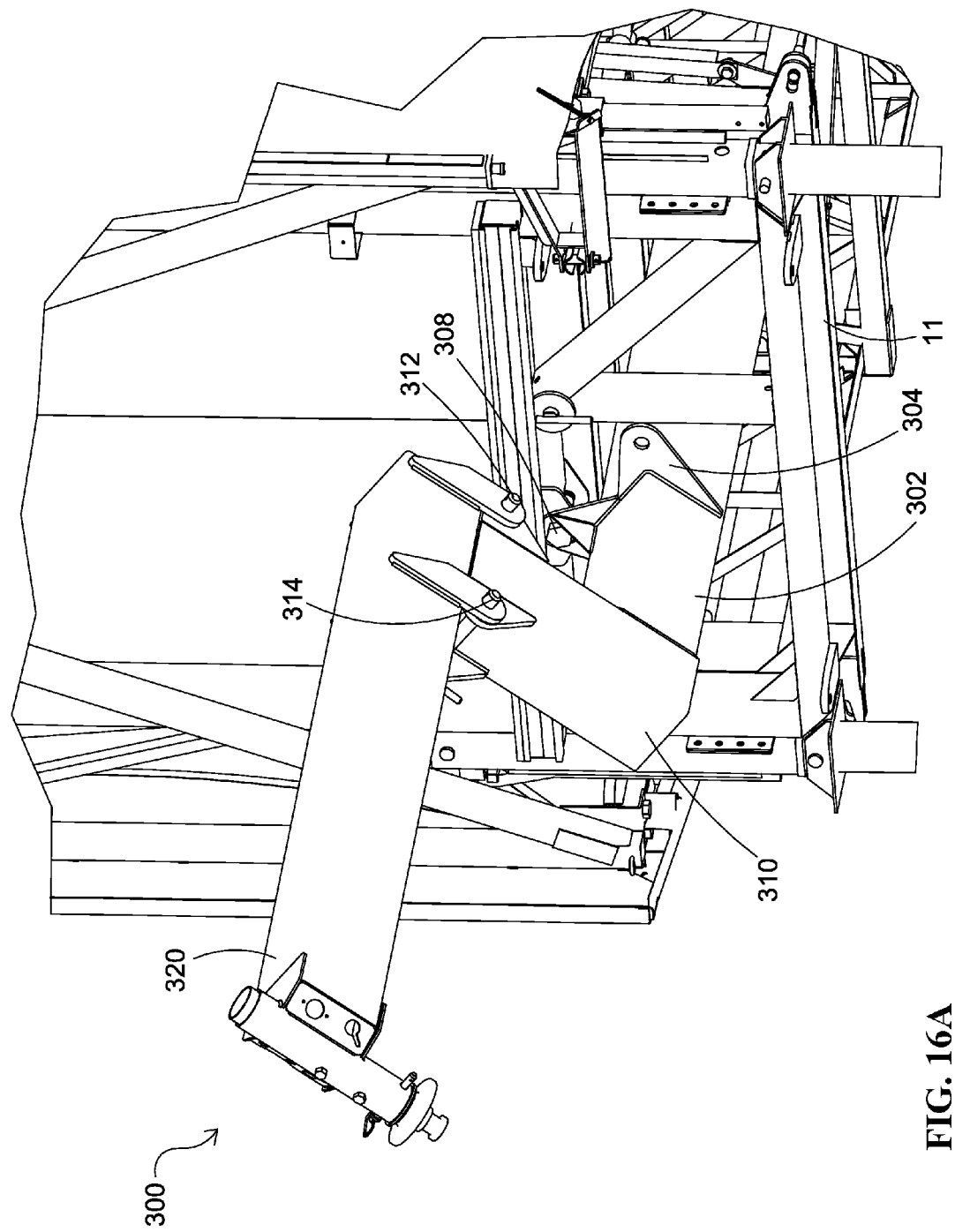
FIG. 16A is an alternate perspective view of the exemplary hitch assembly in a similar position to that of FIG. 16, but with the fabric covering of the canopy wing hidden from view.
Figure 17:
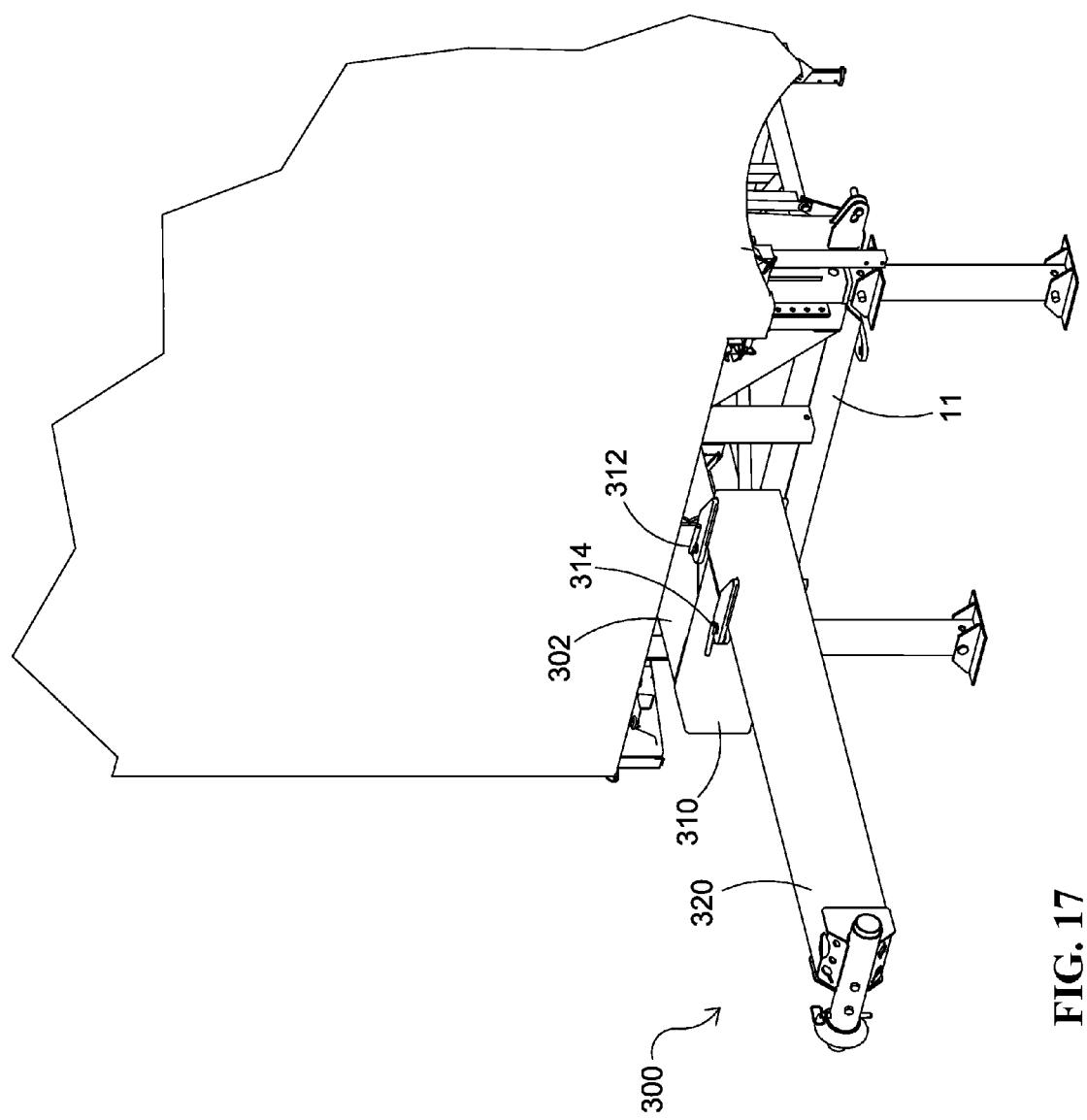
FIG. 17 is another perspective view of the exemplary hitch assembly of FIG. 15 as it is transitioned from the first (transport) position to a second (storage) position.
Figure 17A:
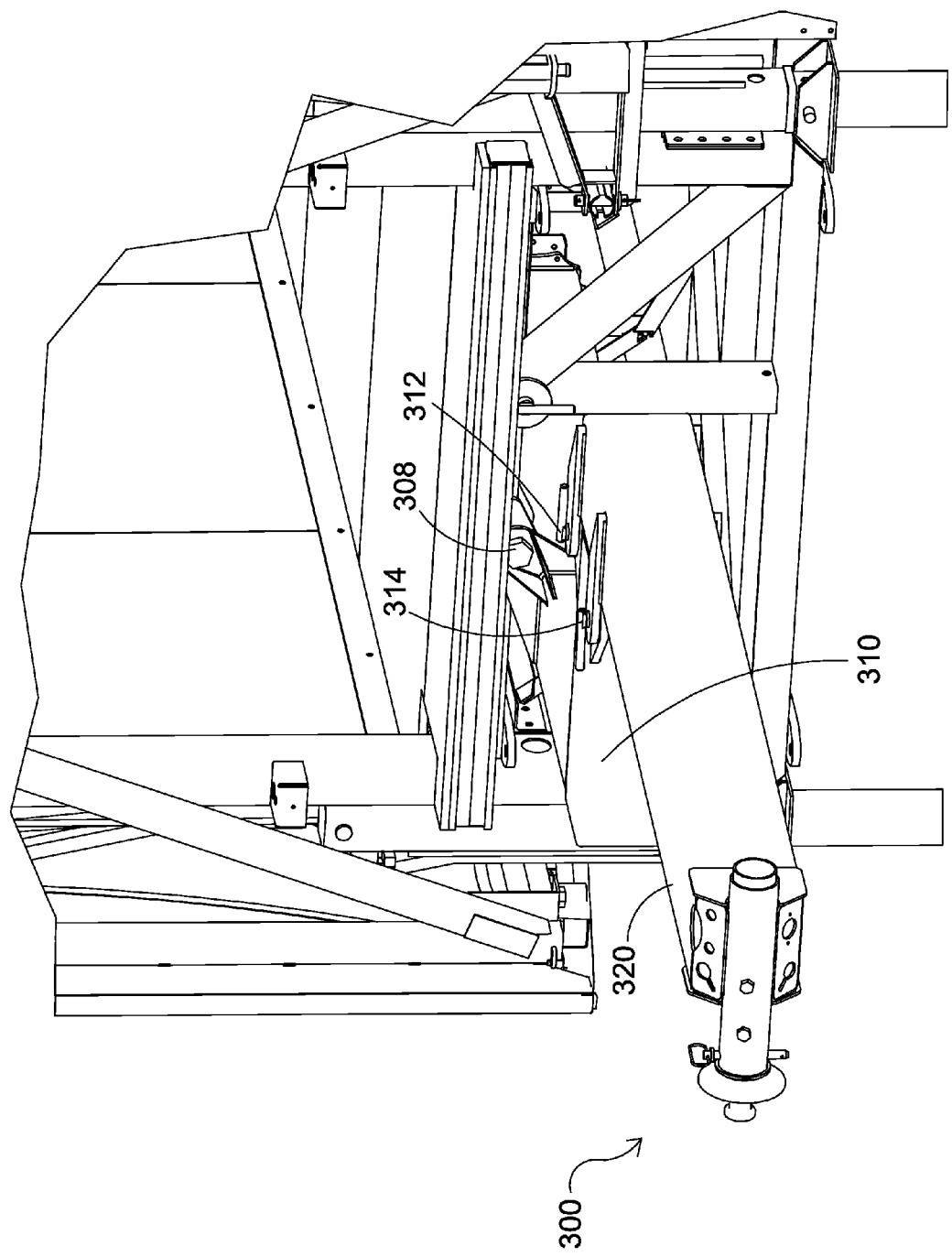
FIG. 17A is an alternate perspective view of the exemplary hitch assembly in a similar position to that of FIG. 17, but with the fabric covering of the canopy wing hidden from view.
Figure 18:
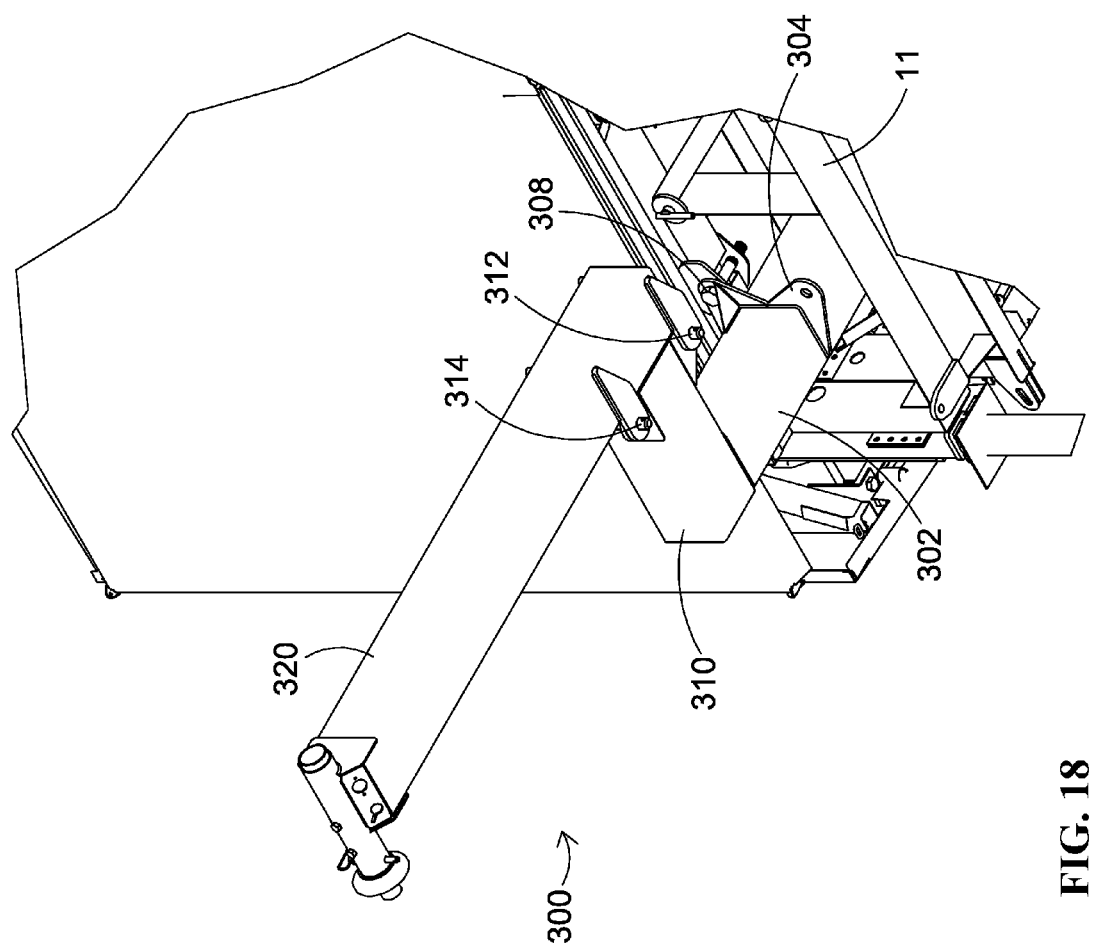
FIG. 18 is another perspective view of the exemplary hitch assembly of FIG. 15 as it is transitioned from the first (transport) position to a second (storage) position.
Figure 18A:
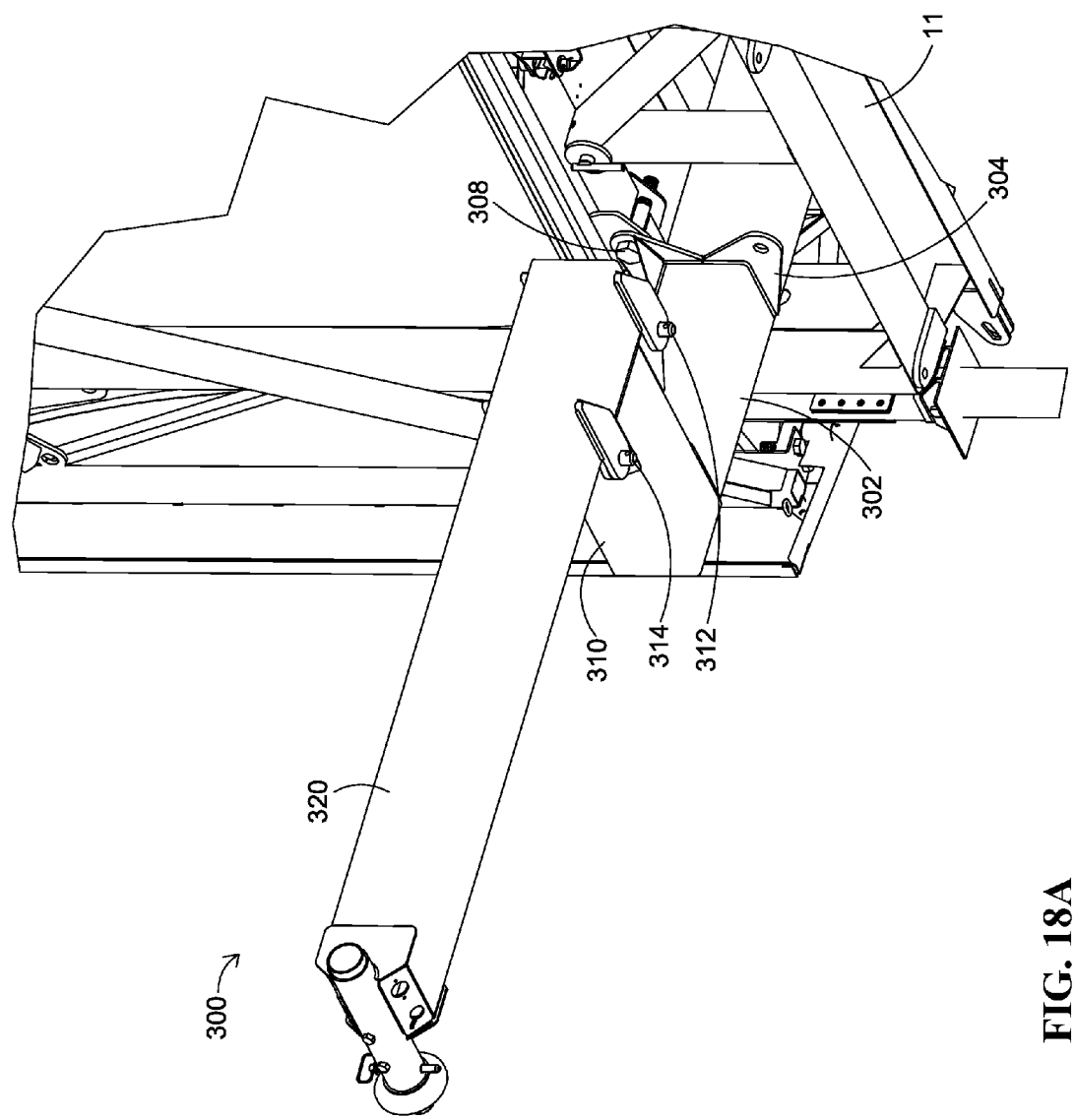
FIG. 18A is an alternate perspective view of the exemplary hitch assembly in a similar position to that of FIG. 18, but with the fabric covering of the canopy wing hidden from view.
Figure 19:
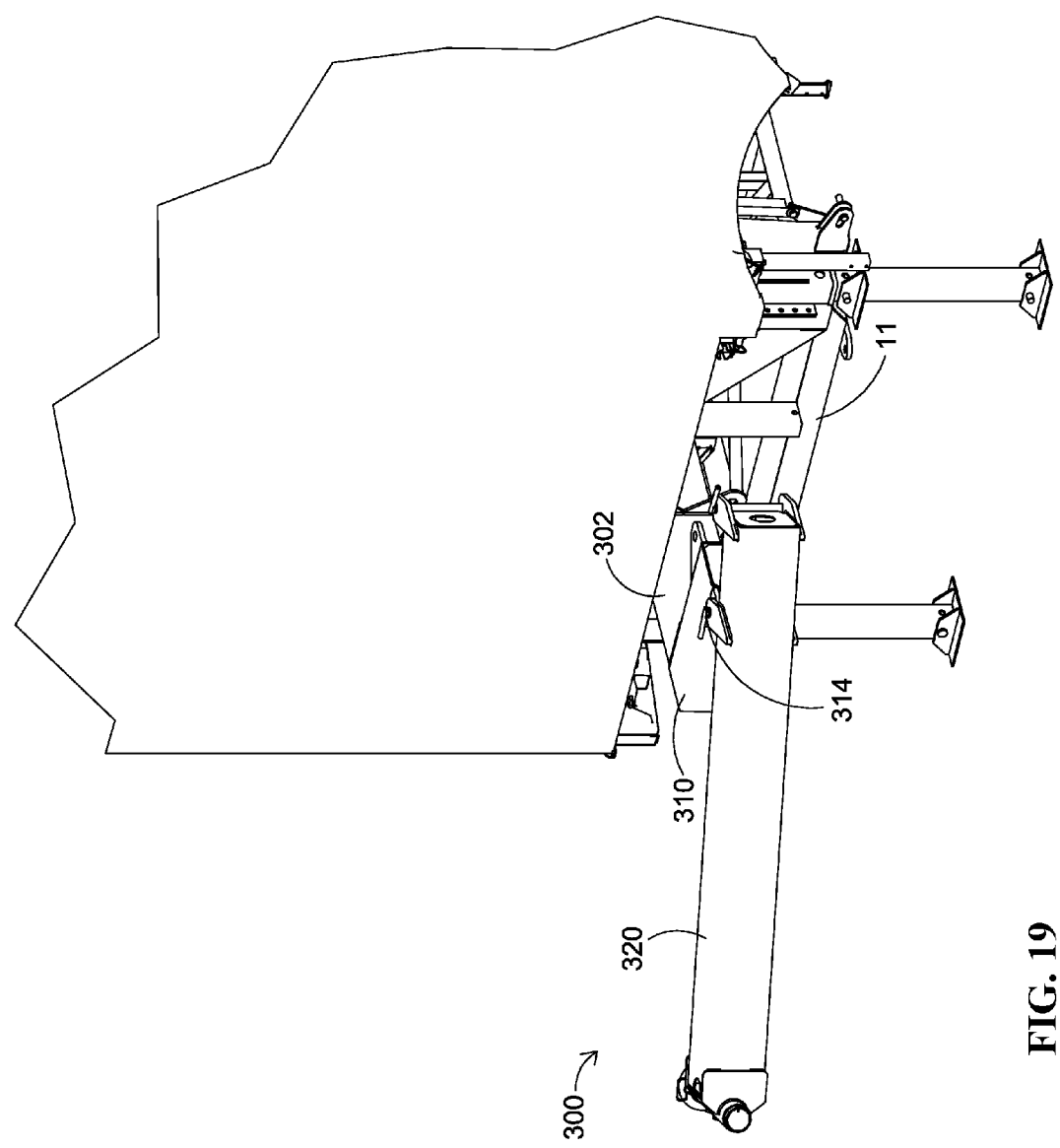
FIG. 19 is another perspective view of the exemplary hitch assembly of FIG. 15 as it is transitioned from the first (transport) position to a second (storage) position.
Figure 19A:
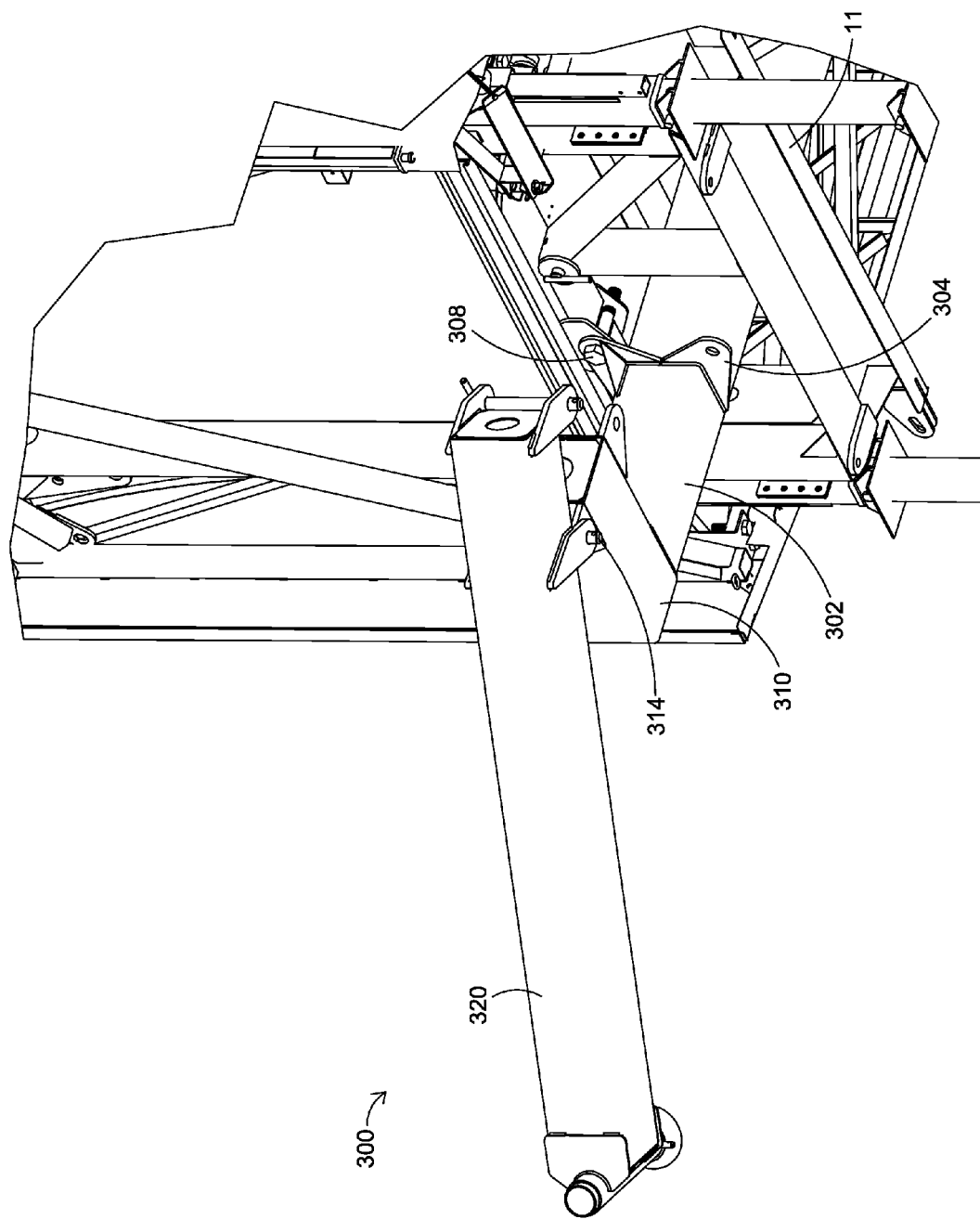
FIG. 19A is an alternate perspective view of the exemplary hitch assembly in a similar position to that of FIG. 19, but with the fabric covering of the canopy wing hidden from view.
Figure 20:
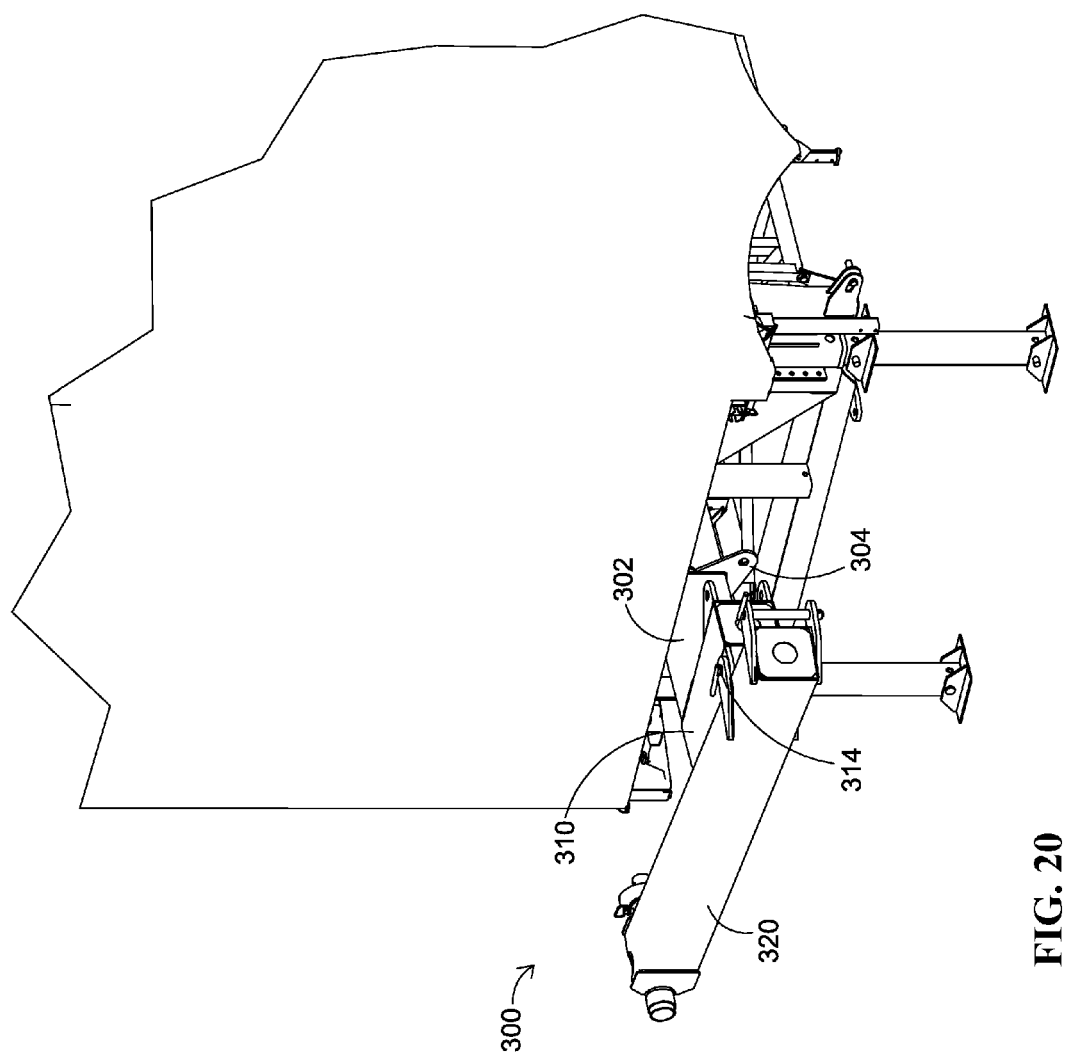
FIG. 20 is a perspective view of the exemplary hitch assembly of FIG. 15 in the second (storage) position.
Figure 20A:
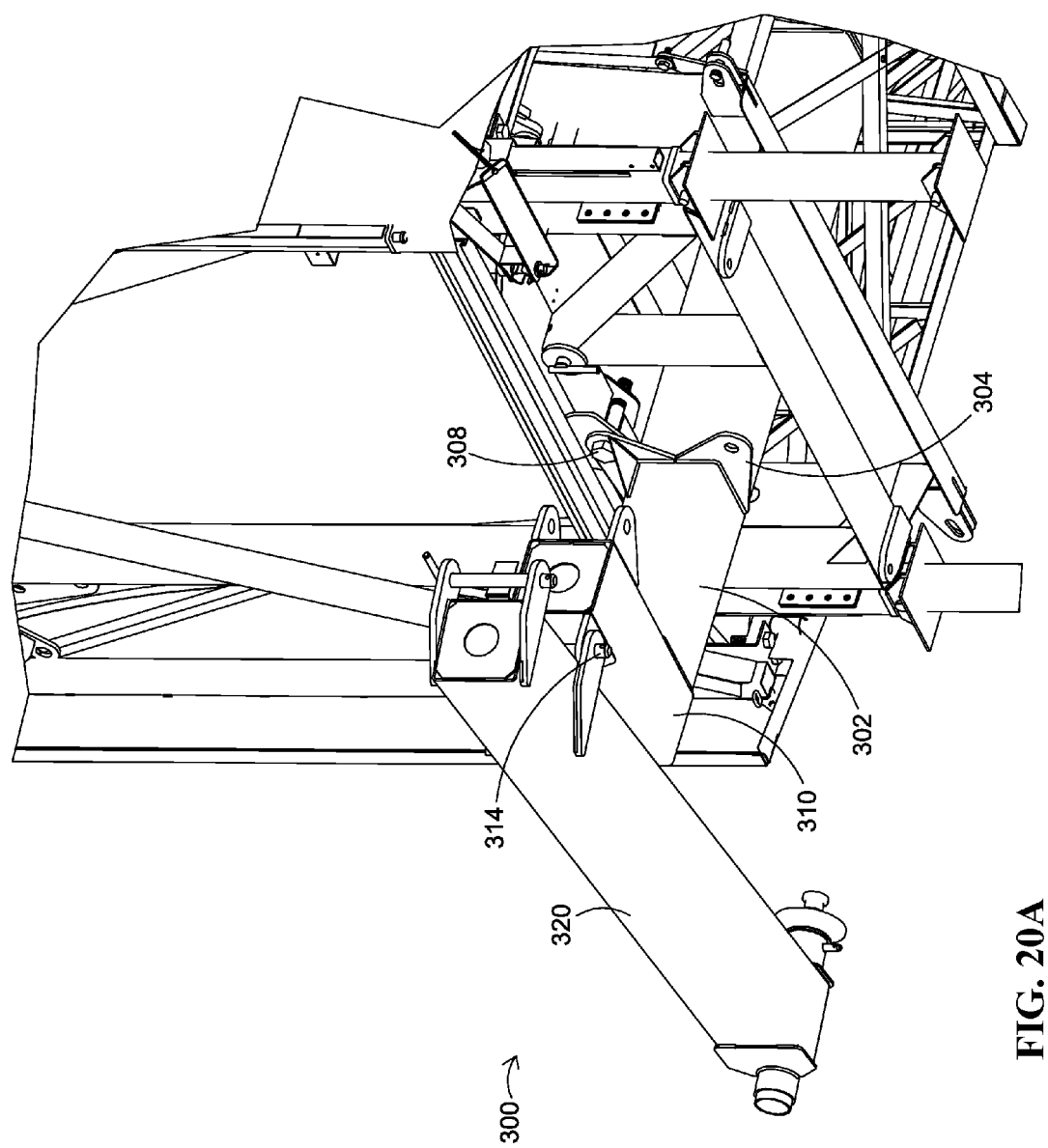
FIG. 20A is an alternate perspective view of the exemplary hitch assembly in the second (storage) position, but with the fabric covering of the canopy wing hidden from view.
Figure 21:
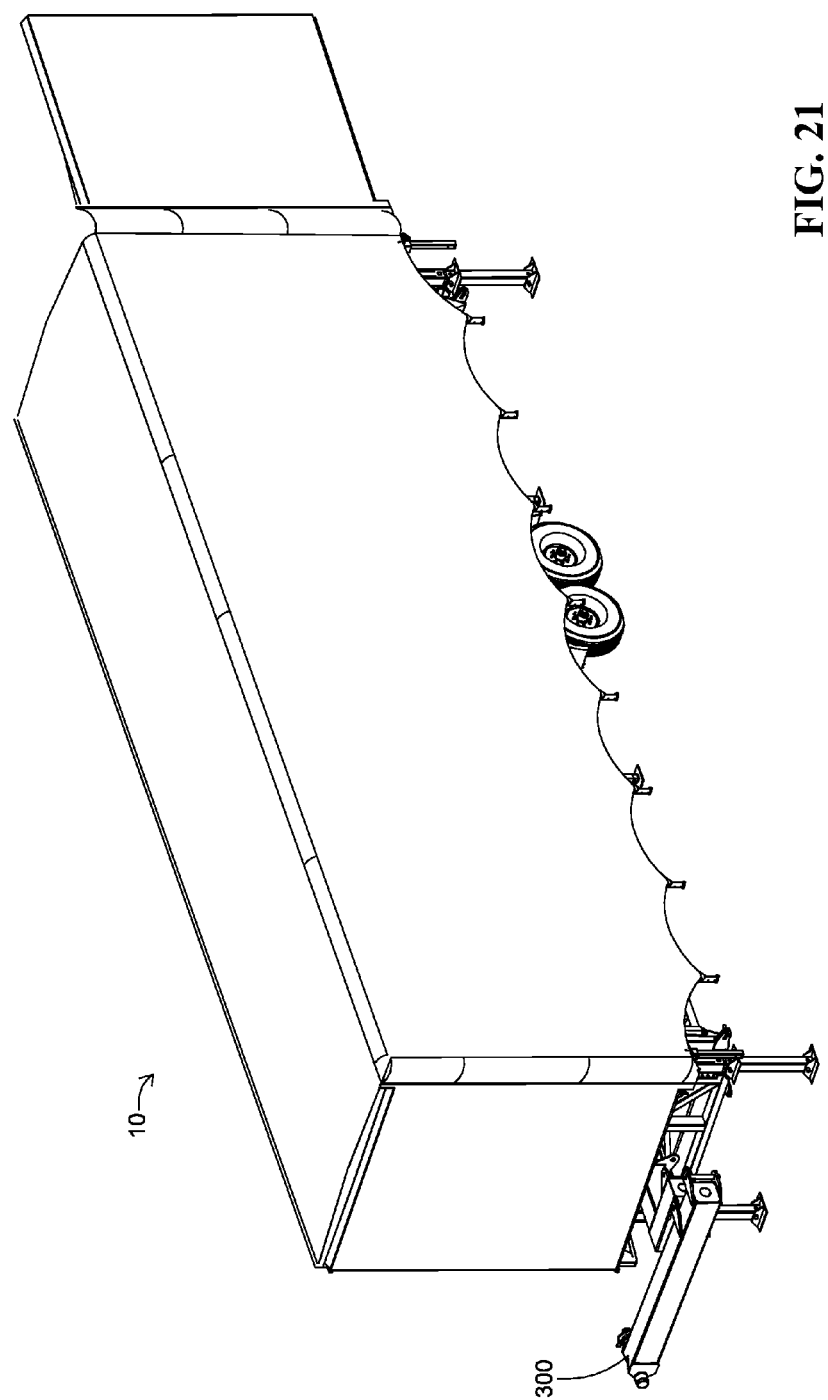
FIG. 21 is a perspective view of the mobile stage system in the transport position and the exemplary hitch assembly in the second (storage) position.

Accordingly, and referring still to FIGS. 15-20 and 15A-20A, it is contemplated that the hitch assembly 300 can be first pivoted from a first (transport) position as shown in FIGS. 15 and 15A to a second (storage) position as shown in FIGS. 20, 20A, and 21. In this exemplary embodiment, the hitch assembly thus includes: a first section 302 with a bracket 304 for securing the hitch assembly to the support structure 11; a second section 310 that is fixed to a distal end of the first section 302 and is oriented perpendicular to the first section 302 (i.e., is upright in the transport position); and a third section 320 that is connected to an end of the second section 310 by two pins 312, 314 and is oriented perpendicular to the second section 310. The pivotal movement of the hitch assembly 300 is then facilitated by the removal of one pin 306 of two pins (or bolts) 306, 308 that pass through the bracket 304 and secure the hitch assembly 300 to the support structure 11 (or the fixed frame 20*a* of one of the superstructures 18*a*), which allows the hitch assembly 300 to rotate about the axis defined by the remaining pin 308, as shown in FIGS. 16, 16A, 17, and 17A. In other words, the hitch assembly 300 is effectively rotated 90° about a horizontal axis. Then, by removing the pin 312 that connects the third section 320 of the hitch assembly 300 to the second section 310, the third section 320 can be rotated about the axis defined by the remaining pin 314, thus allowing the hitch assembly 300 to be folded out of the way when the mobile stage system 10 is in the deployed position, as shown in FIGS. 20, 20A, and 21. In other words, the hitch assembly 300 is then effectively rotated 180° about a vertical axis. Thus, the hitch assembly 300 is out of view of the audience and is not an impediment to entry and exit from the side of the stage near the hitch nor an impediment to communications between performers on the stage and technicians on the side of the stage. Furthermore, the lateral folding of the hitch assembly 300 can be achieved manually and does not require a powered actuator.

As a further refinement, and referring now to FIGS. 22-25, in some exemplary embodiments, the roof panels and the canopy panels of the mobile stage system 10 are in the form of a single, one-piece fabric covering 500, which eliminates leaks and joint maintenance. This is contrasted to many prior art constructions in which the roof and canopy materials are in the form of (i) a fabric covering that is only loosely attached, (ii) a fabric covering that requires reinstallation each time the stage system is set up, or (iii) rigid panels that require separate panels for each of the main roof 170, rear canopy 180, front canopy 190, and left and right canopy wings 120*a*, 120*b*, along with flexible weather joints between panels.

Figure 22:
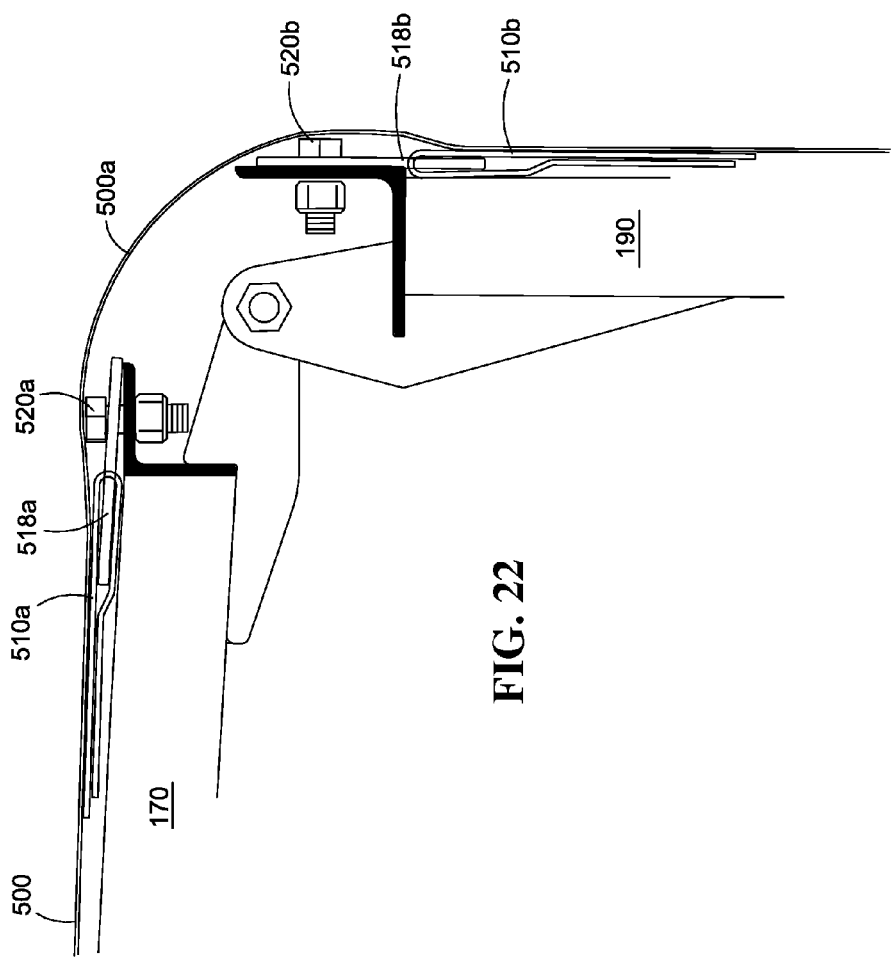
FIG. 22 is a side view of a pivot connection between the main roof and the front canopy of the exemplary mobile stage system of FIG. 1, with the mobile stage system in a transport position and illustrating how a fabric covering spans the pivot connection.
Figure 23:
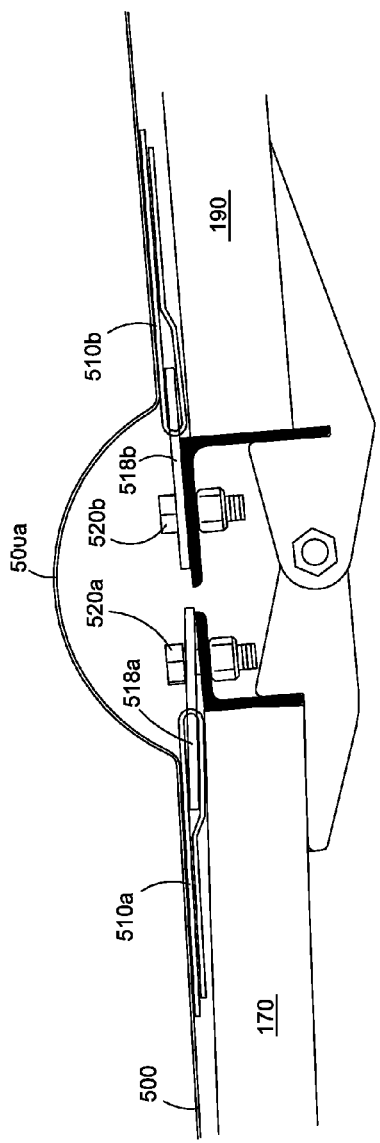
FIG. 23 is a side view of the pivot connection between the main roof and the front canopy similar to FIG. 22, but with the mobile stage system in a deployed position.

FIGS. 22 and 23 are side views that show how a one-piece fabric covering 500 can be installed and spans a pivot connection, for example, a pivot connection between the main roof 170 and the front canopy 190. In this exemplary embodiment, in order to secure the fabric covering 500 to a portion of the main roof 170 and a portion of the front canopy 190, a webbing 510 is used. As shown in FIG. 22, a length of webbing 510*a* is looped through a buckle 518*a* (see also FIG. 25B), and then sewn or welded to the fabric covering 500. The buckle 518*a* is then secured to a portion of the main roof 170 by a fastener 520*a* (such as a bolt or tensioning screw). Similarly, a length of webbing 510*b* is looped through a buckle 518*b*, and then sewn or welded to the fabric covering 500 on the other side of the pivot connection. The buckle 518*b* is then secured to a portion of the front canopy 190 by a fastener 520*b*. Thus, while the webbing 510 ensures that the fabric covering 500 is pulled taut and is in tension when the roof is raised and the canopies deployed, there remains a loose section of the fabric covering 500*a* that spans the gap between the main roof 170 and the front canopy 190, as shown in FIG. 23. This loose section 500*a* of the fabric covering 500 accommodates the transition of the mobile stage system 10 from the deployed position (FIG. 23) to the transport position (FIG. 22). However, the fabric covering 500 is still tight for wind loads when the mobile stage system 10 is in a transport position and weather wind loads when the mobile stage system 10 is in a deployed position.

In other words, the one-piece fabric covering 500 can be characterized as having a main roof panel, a front canopy panel, and a rear canopy panel. Each of the main roof panel, the front canopy panel, and the rear canopy panel can be individually tensioned (as further described below), while a portion of the one-piece fabric covering (i.e., the loose section 500*a*) that spans the pivot connection between the main roof 170 and the front canopy 190 remains untensioned, and while a similar portion of the one-piece fabric covering that spans the pivot connection between the main roof 170 and the rear canopy 180 remains untensioned. Similarly, to the extent that the one-piece fabric covering 500 extends over the left canopy wing 120*a* and the right canopy wing 120*b*, those panels of the one-piece fabric covering 500 can also be individually tensioned, while the portions of the one-piece fabric covering 500 that span the pivot connections remain untensioned.

Figure 24:
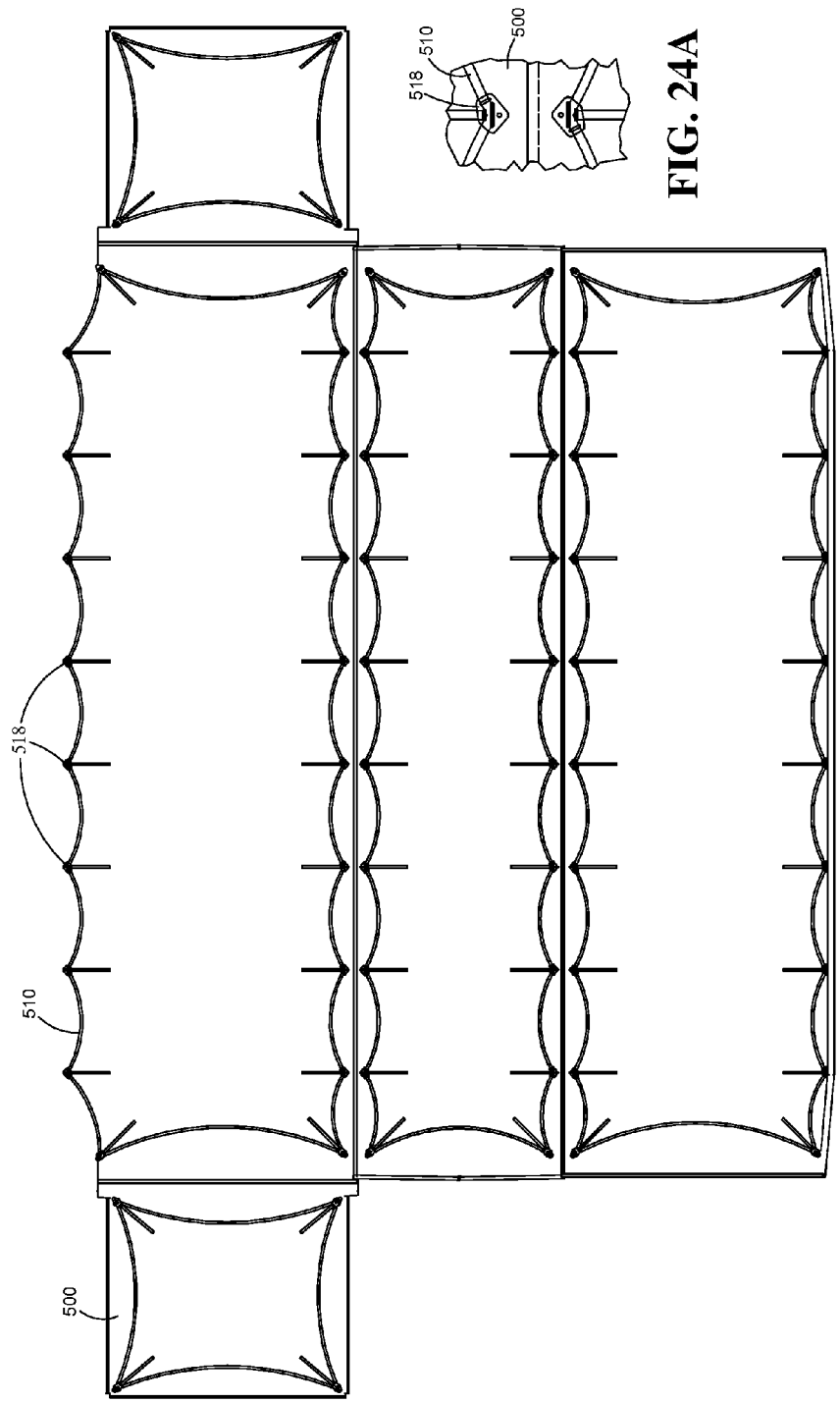
FIG. 24 is a plan view of the fabric covering of FIGS. 22 and 23 that illustrates an exemplary placement and pattern of a webbing in order to achieve catenary tensioning.

As a further refinement, the webbing 510 can also be used to provide the fabric covering 500 with perimeter catenary tensioning to better handle wind loads when the mobile stage system 10 is in transport position or a deployed position, while also preventing fabric sagging and water ponding. FIG. 24 is a plan view of the fabric covering 500 that illustrates an exemplary placement and pattern of the webbing 510 in order to achieve such catenary tensioning; the webbing 510 is on the underside of the fabric covering 500. As described above, and illustrated in FIG. 24 and the enlarged view of FIG. 24A, the lengths of webbing 510 are sewn or welded to portions of the fabric covering 500 and are then secured by buckles (as generally indicated by reference numeral 518) that are positioned around the periphery of fabric covering 500, with each buckle 518 then being secured to a portion of the underlying roof or canopy structure. In this exemplary placement and pattern of the webbing 510, there is a single length of webbing 510a that is threaded through the buckles 518 arrayed around the periphery of each of the main roof 170, the rear canopy 180, the front canopy 190, the left canopy wing 120a and the right canopy wing 120b. Furthermore, there is a separate, discrete length of webbing associated with each buckle 518 that is directed away from the periphery.

Figure 25:
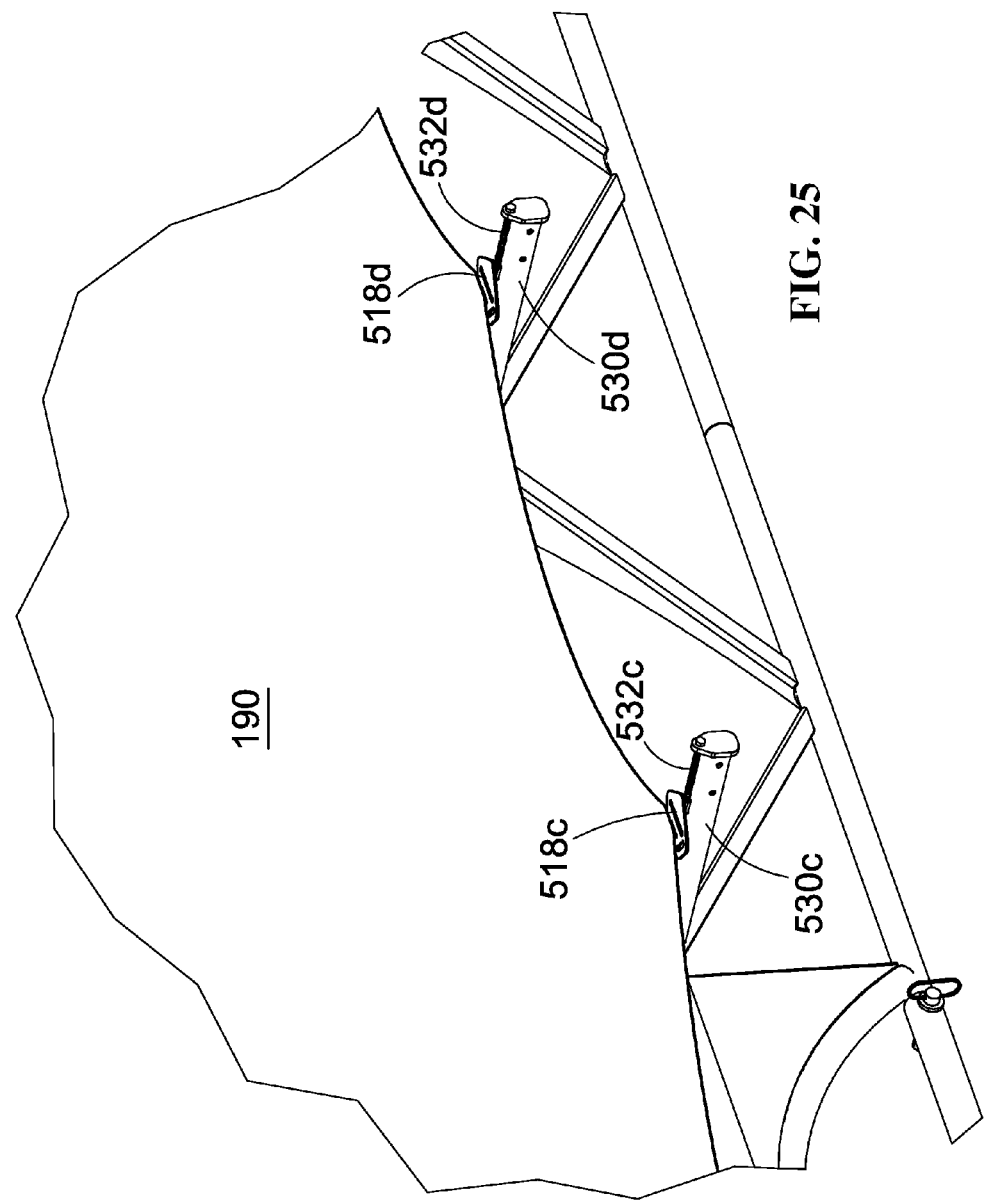
FIG. 25 is an enlarged perspective view of the front edge of the front canopy roof, illustrating the attachment of two buckles to respective brackets extending from the front edge of the front canopy.
Figure 25A:
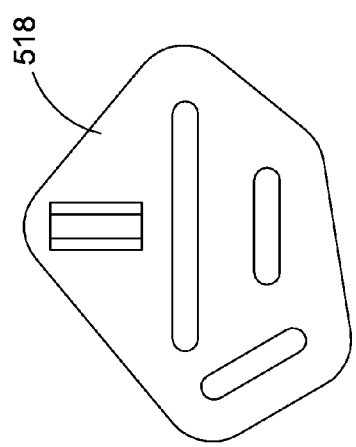
FIG. 25A is a perspective view of one assembly of a buckle and bracket from FIG. 25.
Figure 25B:
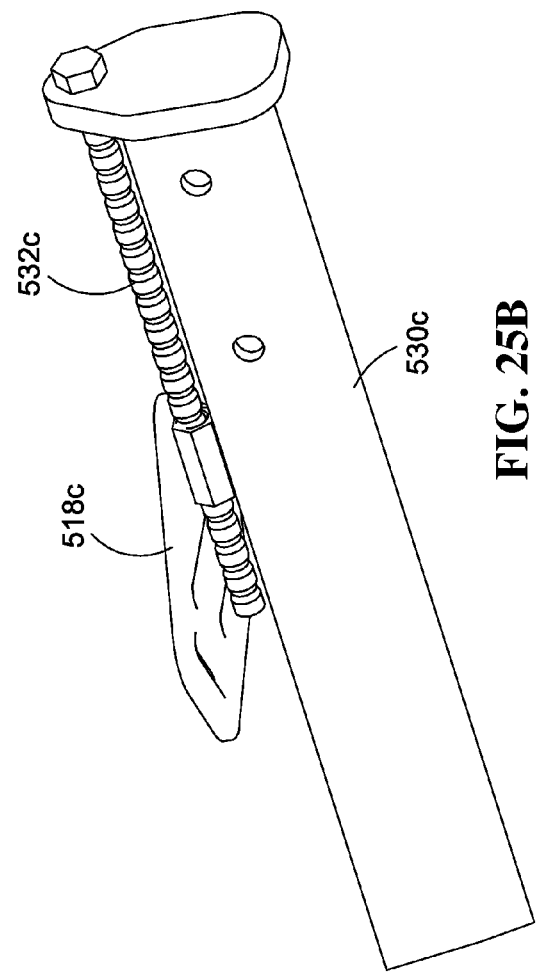
FIG. 25B is a bottom view of a buckle from FIG. 25.

FIG. 25 is an enlarged perspective view of a portion of the front edge of the front canopy 190, illustrating the attachment of two buckles 518c, 518d to respective brackets 530c, 530d extending from a front edge of the front canopy 190. In this regard, in this exemplary embodiment, the position of the buckles 518c, 518d along the length of the brackets 530c, 530d can be adjusted to pull and stretch the fabric covering 500, thus achieving the desired catenary tensioning. Specifically, and as best shown in FIG. 25A, in this exemplary embodiment, each buckle 518c is threaded onto a tensioning screw 532c. By rotating the tensioning screw 532c relative to the bracket 530c, the buckle 518c can be moved along the length of the bracket 530c, thus pulling and stretching the fabric covering 500, and achieving the desired catenary tensioning.

Although not shown in the above-described drawings, cabling or a similar perimeter catenary tensioning system could also be used, instead of webbing, to achieve the desired catenary tensioning without departing from the spirit and scope of the present invention.

One of ordinary skill in the art will recognize that additional embodiments and configurations are also possible without departing from the teachings of the present invention or the scope of the claims which follow. This description, and particularly the specific details of the exemplary embodiments disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A mobile stage system for transitioning between a transport position and a deployed position, comprising:
    a support structure mounted on wheels;
    one or more deck panels fixed to the support structure;
    a first superstructure positioned at a first end of the mobile stage system and mounted to the support structure, said first superstructure including a fixed frame, a lower end pleat, an upper end pleat, a rear link, a front link, a roof support, a rear canopy arm, and a front canopy arm;
    a second superstructure positioned at a second end of the mobile stage system and mounted to the support structure, said second superstructure including a fixed frame, a lower end pleat, an upper end pleat, a rear link, a front link, a roof support, a rear canopy arm, and a front canopy arm;
    one or more roof panels secured to and supported by the roof supports of the first and second superstructures; and
    one or more canopy panels secured to and supported by the rear canopy arms and the front canopy arms of the first and second superstructures;
    wherein the first superstructure includes a rear actuator and a front actuator, such that, as the rear actuator is extended, the rear canopy arm rotates and transitions from the transport position to the deployed position, and as the front actuator is extended, the front canopy arm rotates and transitions from the transport position to the deployed position, and, as a result of the rotation of the rear canopy arm and the front canopy arm, the roof support moves upward relative to the fixed frame, and the lower end pleat and the upper end pleat collectively move from a collapsed position to an extended position; and
    wherein the second superstructure also includes a rear actuator and a front actuator, such that, as the rear actuator is extended, the rear canopy arm rotates and transitions from the transport position to the deployed position, and as the front actuator is extended, the front canopy arm rotates and transitions from the transport position to the deployed position, and, as a result of the rotation of the rear canopy arm and the front canopy arm, the roof support moves upward relative to the fixed frame, and the lower end pleat and the upper end pleat collectively move from a collapsed position to an extended position.

2. The mobile stage system as recited in claim 1, and further comprising:
    a first canopy wing pivotally connected to and extending from the front canopy arm of the first superstructure; and
    a second canopy wing pivotally connected to and extending from the front canopy arm of the second superstructure.

3. The mobile stage system as recited in claim 1, wherein a middle deck panel is fixed to the support structure, wherein a first outer deck panel is pivotally secured to one edge of the middle deck panel, and wherein a second outer deck panel is pivotally secured to an opposite edge of the middle deck panel, such that, when the mobile stage system is in the deployed position, the first and second outer deck panels are rotated downwardly into a substantially horizontal position and cooperate with the middle deck panel to form a stage deck.

4. The mobile stage system as recited in claim 3, and further comprising one or more linkage assemblies operably connected to the first superstructure and one or more linkage assemblies operably connected to the second superstructure, such that as the front actuator and rear actuator of the first and second superstructures are extended, and the roof support moves upward relative to the fixed frame, the first and second outer deck panels are rotated downwardly into the substantially horizontal position.

5. The mobile stage system as recited in claim 4, wherein each linkage assembly includes:
    a first link that is operably connected to either the front canopy arm or the rear canopy arm and is also pivotally connected to the fixed frame;
    a second, substantially vertical link that is pivotally connected to and extends downward from the first link, such that, as the front canopy arm or the rear canopy arm rotates and transitions from the transport position to the deployed position, the first link rotates and forces the second, substantially vertical link downward; and
    a bell crank that is mounted for rotation relative to the fixed frame, with a distal end of the second, substantially vertical link pivotally connected to one end of the bell crank, and with an opposite end of the bell crank fixed to one of the outer deck panels, such that a downward movement of the second, substantially vertical link causes the bell crank to rotate, and such rotation then causes the outer deck panel to be rotated downwardly into the substantially horizontal position.

6. The mobile stage system as recited in claim 1, and further comprising a hitch assembly secured to and extending from the mobile stage system, said hitch assembly being configured for rotation about a horizontal axis and rotation about a vertical axis, such that the hitch assembly can be transitioned between a transport position and a storage position.

7. The mobile stage system as recited in claim 6, wherein said hitch assembly includes:
- a first section that includes a bracket for securing the hitch assembly to the support structure;
- a second section that is fixed to a distal end of the first section and is oriented perpendicular to the first section; and
- a third section that is connected to an end of the second section by two pins and is oriented perpendicular to the second section;
- wherein a first pivotal movement of the hitch assembly is facilitated by the removal of a pin passing through the bracket that secures the hitch assembly to the support structure, which allows the hitch assembly to rotate about an axis defined by another pin passing through the bracket; and
- wherein a second pivotal movement of the hitch assembly is facilitated by the removal of one of the two pins that connects the third section to the second section, such that the third section can be rotated about the axis defined by a remaining pin, thus allowing the hitch assembly to be folded out of the way when the mobile stage system is in the deployed position.

8. A mobile stage system, comprising:
a support structure;
one or more deck panels fixed to the support structure;
a first superstructure positioned at a first end of the mobile stage system and mounted to the support structure;
a second superstructure positioned at a second end of the mobile stage system and mounted to the support structure;
a roof supported by the first and second superstructures, said roof including a main roof, a front canopy that is pivotally connected to the main roof, and a rear canopy that is pivotally connected to the main roof; and
a one-piece fabric covering that extends over and is secured to the main roof, the front canopy, and the rear canopy, said one-piece fabric covering spanning a first pivot connection between the main roof and the front canopy, and said one-piece fabric covering spanning a second pivot connection between the main roof and the rear canopy, wherein there is a loose section of the one-piece fabric covering that spans the first pivot connection between the main roof and the front canopy, thus accommodating the pivotal movement of the front canopy relative to the main roof.

9. A mobile stage system, comprising:
a support structure;
one or more deck panels fixed to the support structure;
a first superstructure positioned at a first end of the mobile stage system and mounted to the support structure;
a second superstructure positioned at a second end of the mobile stage system and mounted to the support structure;
a roof supported by the first and second superstructures, said roof including a main roof, a front canopy that is pivotally connected to the main roof, and a rear canopy that is pivotally connected to the main roof; and
a one-piece fabric covering that extends over and is secured to the main roof, the front canopy, and the rear canopy, said one-piece fabric covering spanning a first pivot connection between the main roof and the front canopy, and said one-piece fabric covering spanning a second pivot connection between the main roof and the rear canopy;
wherein the roof further includes a first canopy wing pivotally connected to and extending from the front canopy and a second canopy wing pivotally connected to and extending from the front canopy, and wherein the one-piece fabric covering extends over and is secured to the first canopy wing and the second canopy wing, said one-piece fabric covering spanning a third pivot connection between the first canopy wing and the front canopy, and said one-piece fabric covering spanning a fourth pivot connection between the second canopy wing and the front canopy.

10. The mobile stage system as recited in claim 8, wherein there is also a loose section of the one-piece fabric covering that spans the second pivot connection between the main roof and the rear canopy, thus accommodating the pivotal movement of the rear canopy relative to the main roof.

11. The mobile stage system as recited in claim 8, and further comprising:
- a first plurality of lengths of webbing, wherein each of the first plurality of lengths of webbing is sewn or welded to the one-piece fabric covering and then secured to a portion of the main roof by a fastener, thus securing the one-piece fabric covering to the main roof;
- a second plurality of lengths of webbing, wherein each of the second plurality of lengths of webbing is sewn or welded to the one-piece fabric covering and then secured to a portion of the front canopy by a fastener, thus securing the one-piece fabric covering to the front canopy; and
- a third plurality of lengths of webbing, wherein each of the third plurality of lengths of webbing is sewn or welded to the one-piece fabric covering and then secured to a portion of the rear canopy by a fastener, thus securing the one-piece fabric covering to the rear canopy.

12. The mobile stage system as recited in claim 11, wherein (a) each of the first plurality of lengths of webbing is looped through one or more buckles, each of which, in turn, is secured to a portion of the main roof by the fastener, thus securing the one-piece fabric covering to the main roof, (b) each of the second plurality of lengths of webbing is looped through one or more buckles, each of which, in turn, is secured to a portion of the front canopy by the fastener, thus securing the one-piece fabric covering to the front canopy, and (c) each of the third plurality of lengths of webbing is looped through a-one or more buckles, each of which, in turn, is secured to a portion of the rear canopy by the fastener, thus securing the one-piece fabric covering to the rear canopy.

13. A mobile stage system, comprising:
a support structure;
one or more deck panels fixed to the support structure;
a first superstructure positioned at a first end of the mobile stage system and mounted to the support structure;
a second superstructure positioned at a second end of the mobile stage system and mounted to the support structure;

a roof supported by the first and second superstructures, said roof including a main roof, a front canopy that is pivotally connected to the main roof, and a rear canopy that is pivotally connected to the main roof;

a one-piece fabric covering that extends over and is secured to the main roof, the front canopy, and the rear canopy, said one-piece fabric covering spanning a first pivot connection between the main roof and the front canopy, and said one-piece fabric covering spanning a second pivot connection between the main roof and the rear canopy; and a perimeter webbing that is sewn or welded to the one-piece fabric covering near a front edge of the front canopy, wherein: (a) said perimeter webbing is looped through a buckle at selected intervals; (b) wherein each of said buckles is secured to a bracket, which, in turn, is secured to a portion of the front canopy; and (c) a position of each of said buckles relative to the bracket is adjustable.

14. The mobile stage system as recited in claim 13, wherein each of said buckles is threaded onto a respective tensioning screw, such that, rotation of the tensioning screw relative to the bracket causes the buckle to move along the length of the bracket.

15. A mobile stage system, comprising:
a support structure;
one or more deck panels fixed to the support structure;
a first superstructure positioned at a first end of the mobile stage system and mounted to the support structure,
a second superstructure positioned at a second end of the mobile stage system and mounted to the support structure,
a roof supported by the first and second superstructures, said roof including a main roof, a front canopy that is pivotally connected to the main roof, and a rear canopy that is pivotally connected to the main roof; and
a one-piece fabric covering that extends over and is secured to the main roof, the front canopy, and the rear canopy, such that the one-piece fabric covering can be characterized as having a main roof panel, a front canopy panel, and a rear canopy panel, with each of the main roof panel, the front canopy panel, and the rear canopy panel being individually tensioned, while a portion of the one-piece fabric covering that spans a first pivot connection between the main roof and the front canopy remains untensioned, and while a portion of the one-piece fabric covering that spans a second pivot connection between the main roof and the rear canopy remains untensioned.

16. The mobile stage system as recited in claim 15, wherein each of the main roof panel, the front canopy panel, and the rear canopy panel is individually tensioned by a perimeter catenary tensioning system.

17. A mobile stage system, comprising:
a support structure mounted on wheels;
one or more deck panels fixed to the support structure;
a first superstructure positioned at a first end of the mobile stage system and mounted to the support structure;
a second superstructure positioned at a second end of the mobile stage system and mounted to the support structure;
one or more roof panels secured to and supported by the first and second superstructures; and
a hitch assembly secured to and extending from the mobile stage system, said hitch assembly being configured for rotation about a horizontal axis and rotation about a vertical axis, such that the hitch assembly can be transitioned between a transport position and a storage position.

18. The mobile stage system as recited in claim 17, wherein said hitch assembly includes:
a first section that includes a bracket for securing the hitch assembly to the support structure;
a second section that is fixed to a distal end of the first section and is oriented perpendicular to the first section; and
a third section that is connected to an end of the second section by two pins and is oriented perpendicular to the second section;
wherein a first pivotal movement of the hitch assembly is facilitated by the removal of a pin passing through the bracket that secures the hitch assembly to the support structure, which allows the hitch assembly to rotate about an axis defined by another pin passing through the bracket; and
wherein a second pivotal movement of the hitch assembly is facilitated by the removal of one of the two pins that connects the third section to the second section, such that the third section can be rotated about the axis defined by a remaining pin, thus allowing the hitch assembly to be folded out of the way when the mobile stage system is in a deployed position.

19. A mobile stage system for transitioning between a transport position and a deployed position, comprising:
a support structure mounted on wheels;
one or more deck panels fixed to the support structure;
at least one superstructure mounted to the support structure, the at least one superstructure including a fixed frame and a roof support;
a roof supported by the roof support of the at least one superstructure, wherein said roof is in a substantially horizontal orientation in the transport position, but in an angled orientation in a deployed position; and
one or more actuators, such that, as the one or more actuators are extended, the roof support of the at least one superstructure moves upward relative to the fixed frame of the at least one superstructure, while the roof simultaneously rotates from the substantially horizontal orientation to the angled orientation.

* * * * *

UNITED STATES PATENT AND TRADEMARK OFFICE
CERTIFICATE OF CORRECTION

PATENT NO.       : 8,978,311 B1
APPLICATION NO.  : 14/047161
DATED            : March 17, 2015
INVENTOR(S)      : Robert D. Uhl Page 1 of 1

It is certified that error appears in the above-identified patent and that said Letters Patent is hereby corrected as shown below:

In the claims:

In claim 12, col. 12, line 57: delete "a-one" and replace with "one"

Signed and Sealed this
Twenty-eighth Day of July, 2015

Michelle K. Lee
*Director of the United States Patent and Trademark Office*